US012604060B2

(12) United States Patent
Skliba et al.

(10) Patent No.: US 12,604,060 B2
(45) Date of Patent: *Apr. 14, 2026

(54) METHODS AND SYSTEMS FOR GENERATING NOTIFICATIONS BASED ON THE INTERESTS OF GUESTS

(71) Applicant: Adeia Guides Inc., San Jose, CA (US)

(72) Inventors: Barbara F. Skliba, Mountain View, CA (US); Claire Marie Wallters, Saratoga, CA (US); George John Oehling, Bellevue, WA (US); Milan Indu Patel, Santa Clara, CA (US)

(73) Assignee: Adeia Guides Inc., San Jose, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 18/588,876

(22) Filed: Feb. 27, 2024

(65) Prior Publication Data

US 2025/0119620 A1 Apr. 10, 2025

Related U.S. Application Data

(63) Continuation of application No. 17/964,320, filed on Oct. 12, 2022, now Pat. No. 11,949,956, which is a
(Continued)

(51) Int. Cl.
*H04N 21/472* (2011.01)
*H04L 67/306* (2022.01)
(Continued)

(52) U.S. Cl.
CPC ..... *H04N 21/47214* (2013.01); *H04L 67/306* (2013.01); *H04N 21/2143* (2013.01);
(Continued)

(58) Field of Classification Search
CPC ......... H04N 21/47214; H04N 21/2143; H04N 21/25891; H04N 21/4122; H04N 21/43615; H04N 21/488; H04L 67/306
See application file for complete search history.

(56) References Cited

U.S. PATENT DOCUMENTS 6,239,794 B1 5/2001 Yuen et al.
6,564,378 B1 5/2003 Satterfield et al.
(Continued)

FOREIGN PATENT DOCUMENTS

EP 1343317 A2 9/2003
WO 9901984 A1 1/1999
WO 0004707 A1 1/2000

OTHER PUBLICATIONS

"IPRP", International Preliminary Report of Patentability of PCT/US2017/040373 dated Dec. 31, 2019.
(Continued)

*Primary Examiner* — Anthony Bantamoi
(74) *Attorney, Agent, or Firm* — HALEY GUILIANO LLP

(57) ABSTRACT

Methods and systems are provided herein for generating notifications based on the interests of guests. Guests may request notifications on their host's television, and the system will generate notifications based on the guest's interests and preferences as stored in the guest's user profile. In doing so, the guest will be notified of events of interest, such as when a favorite sports team scores a point or when an important scene in a favorite movie is playing. The system monitors the network of the apartment or house and detects when a guest device is accessing the network. The system then accesses the guest's interests and identifies a set of programs based on these interests. The system then monitors these programs and generates notifications on the display device when an event of interest has occurred in one of the identified programs.

20 Claims, 14 Drawing Sheets

Related U.S. Application Data continuation of application No. 17/326,550, filed on May 21, 2021, now Pat. No. 11,503,374, which is a continuation of application No. 16/623,098, filed as application No. PCT/US2017/040373 on Jun. 30, 2017, now Pat. No. 11,044,527.

(51) Int. Cl.

| | |
|---|---|
| *H04N 21/214* | (2011.01) |
| *H04N 21/258* | (2011.01) |
| *H04N 21/41* | (2011.01) |
| *H04N 21/436* | (2011.01) |
| *H04N 21/488* | (2011.01) |

(52) U.S. Cl.
CPC ... *H04N 21/25891* (2013.01); *H04N 21/4122* (2013.01); *H04N 21/43615* (2013.01); *H04N 21/4882* (2013.01)

(56) References Cited

U.S. PATENT DOCUMENTS

| | | | |
|---|---|---|---|
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 8,782,121 | B1 | 7/2014 | Chang |
| 10,771,458 | B1 | 9/2020 | Xia et al. |
| 11,044,527 | B2 | 6/2021 | Skliba et al. |
| 11,503,374 | B2 | 11/2022 | Skliba et al. |
| 11,949,956 | B2 | 4/2024 | Skliba et al. |
| 2002/0174430 | A1 | 11/2002 | Ellis et al. |
| 2005/0251827 | A1 | 11/2005 | Ellis et al. |
| 2006/0137005 | A1 | 6/2006 | Park |
| 2010/0153885 | A1 | 6/2010 | Yates |
| 2010/0229194 | A1 | 9/2010 | Blanchard et al. |
| 2012/0072944 | A1 | 3/2012 | Felt et al. |
| 2017/0026364 | A1 | 1/2017 | Tong et al. |
| 2021/0352373 | A1 | 11/2021 | Skliba et al. |
| 2023/0106485 | A1 | 4/2023 | Skliba et al. |

OTHER PUBLICATIONS

"ISR and Written Opinion", International Search Report and Written Opinion of PCT/US2017/040373 dated Mar. 28, 2018.

500

600

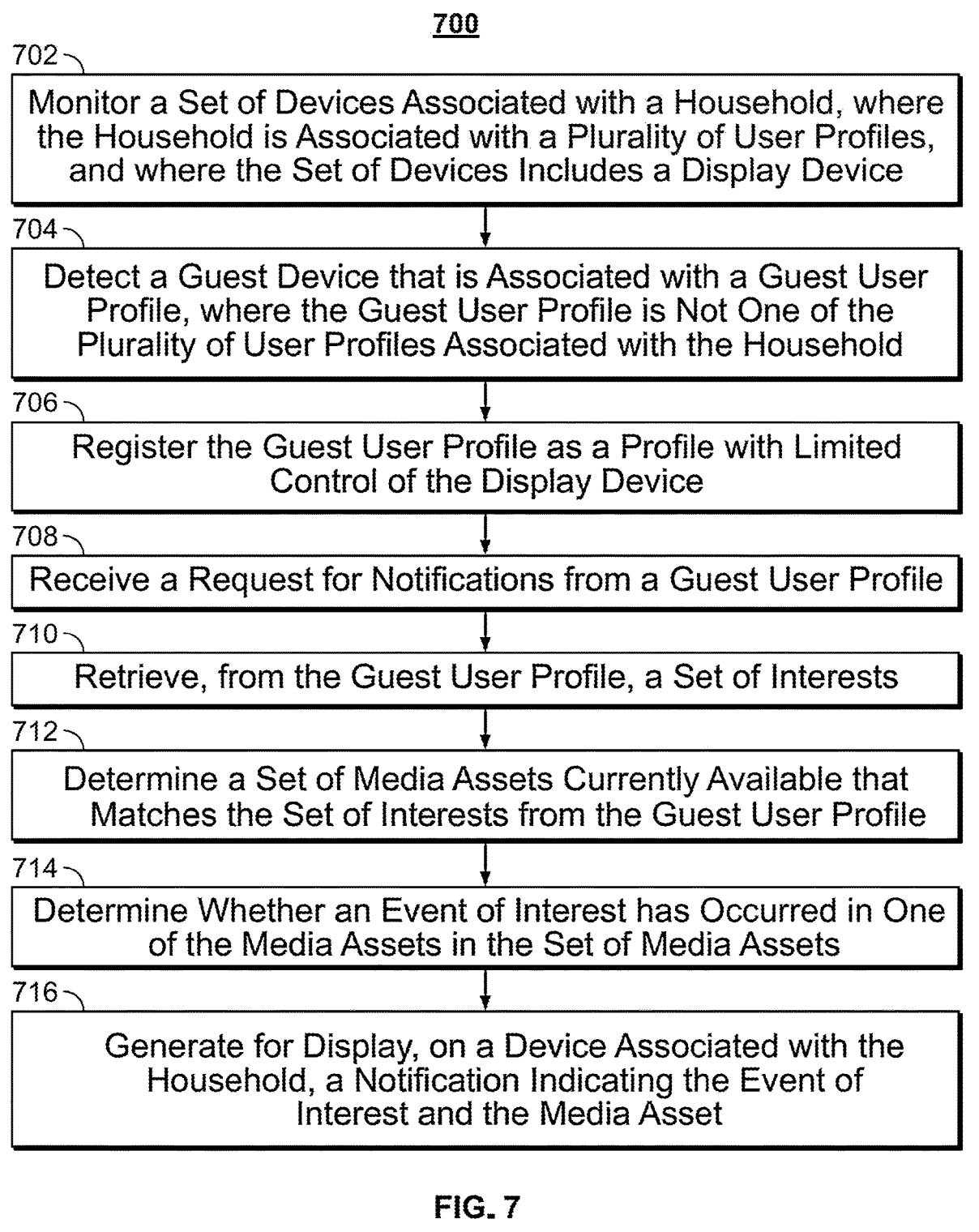

700

702 — Monitor a Set of Devices Associated with a Household, where the Household is Associated with a Plurality of User Profiles, and where the Set of Devices Includes a Display Device 704 — Detect a Guest Device that is Associated with a Guest User Profile, where the Guest User Profile is Not One of the Plurality of User Profiles Associated with the Household 706 — Register the Guest User Profile as a Profile with Limited Control of the Display Device 708 — Receive a Request for Notifications from a Guest User Profile 710 — Retrieve, from the Guest User Profile, a Set of Interests 712 — Determine a Set of Media Assets Currently Available that Matches the Set of Interests from the Guest User Profile 714 — Determine Whether an Event of Interest has Occurred in One of the Media Assets in the Set of Media Assets 716 — Generate for Display, on a Device Associated with the Household, a Notification Indicating the Event of Interest and the Media Asset

FIG. 7

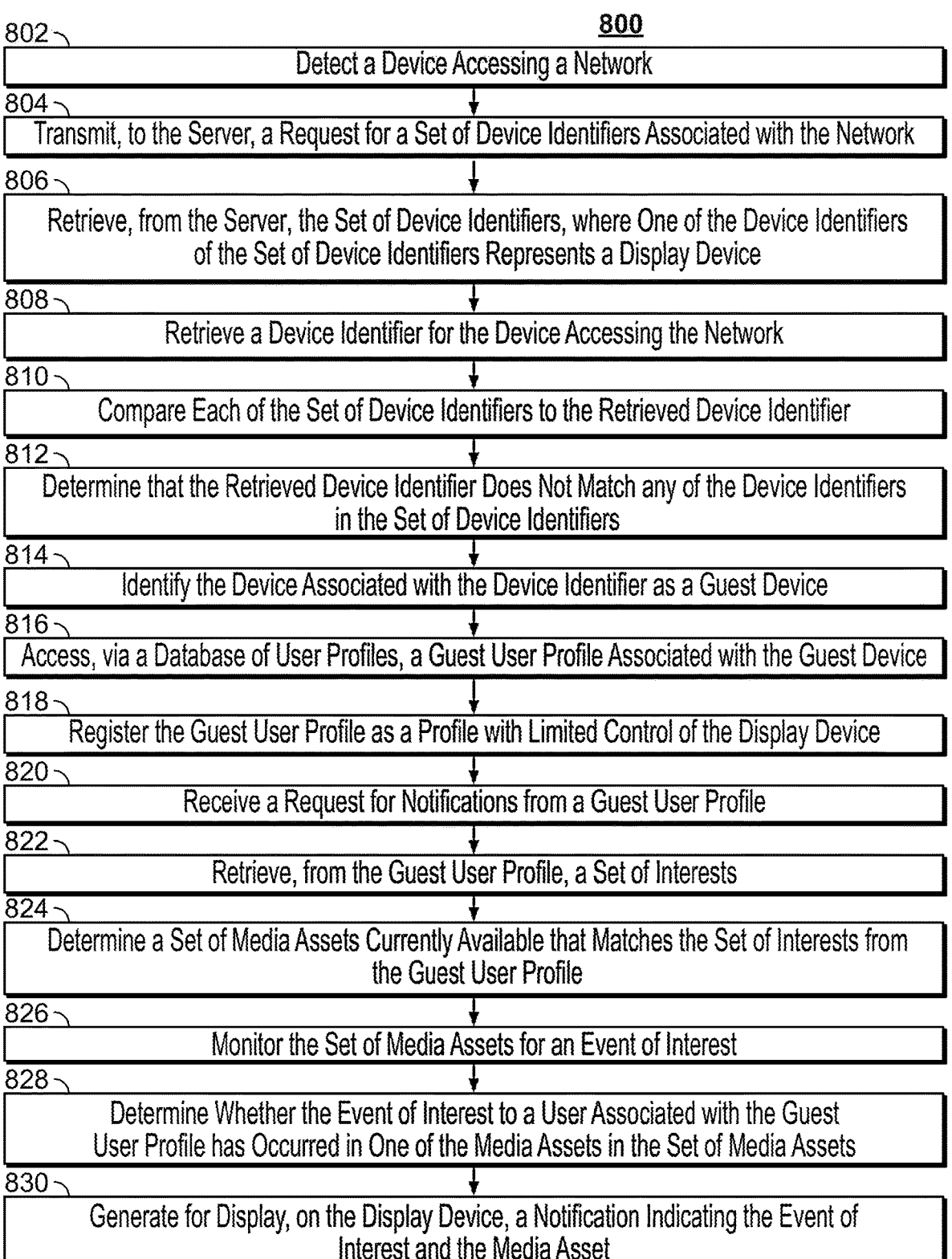

802 — Detect a Device Accessing a Network

804 — Transmit, to the Server, a Request for a Set of Device Identifiers Associated with the Network 806 — Retrieve, from the Server, the Set of Device Identifiers, where One of the Device Identifiers of the Set of Device Identifiers Represents a Display Device 808 — Retrieve a Device Identifier for the Device Accessing the Network 810 — Compare Each of the Set of Device Identifiers to the Retrieved Device Identifier 812 — Determine that the Retrieved Device Identifier Does Not Match any of the Device Identifiers in the Set of Device Identifiers 814 — Identify the Device Associated with the Device Identifier as a Guest Device 816 — Access, via a Database of User Profiles, a Guest User Profile Associated with the Guest Device 818 — Register the Guest User Profile as a Profile with Limited Control of the Display Device 820 — Receive a Request for Notifications from a Guest User Profile 822 — Retrieve, from the Guest User Profile, a Set of Interests 824 — Determine a Set of Media Assets Currently Available that Matches the Set of Interests from the Guest User Profile 826 — Monitor the Set of Media Assets for an Event of Interest 828 — Determine Whether the Event of Interest to a User Associated with the Guest User Profile has Occurred in One of the Media Assets in the Set of Media Assets 830 — Generate for Display, on the Display Device, a Notification Indicating the Event of Interest and the Media Asset

1002 — Receive Request from User Device to Access Network

1004 — Receive User Device Credentials

1006 — Compare Credentials to Network Requirements

1008 — Is the User Device Allowed to Access the Network ?

No

1010 — Refrain from Granting User Device Access to the Network

Yes

1012 — Provide User Device Access to the Network

1014 — Register Device ID as Accessing the Network

__1100__

1102
Determine Network ID

1104
Request, from Database of User Profiles, the
Set of Users Associated with the Network ID 1106
Determine, for Each User in the Set of Users,
a Device Identifier for a Device Associated
with the User 1108
Compile a Set of Device Identifiers Based
on the Devices Associated with Each User

1200

1202 ⌐
Receive Set of Device Identifiers

1204 ⌐
Retrieve One of the Device Identifiers from the Set

1206 ⌐
Search Database of User Profiles for Users Associated with the Device Identifier 1208 ⌐
Are there Multiple Users Associated with the Device Identifier?

Yes        No

1210 ⌐
Tag as Display Device

1212 ⌐
Tag as Personal Device

1300

1302 — 
Request, from Device, a Guest User ID Associated with Guest Device

1304 — 
Receive, from Device, a Guest User ID

1306 — 
Generate Request for User Profile Information Associated with Guest User ID 1308 — 
Transmit Request to Server for User Profile Information 1310 — 
Receive, from Server, User Profile Information

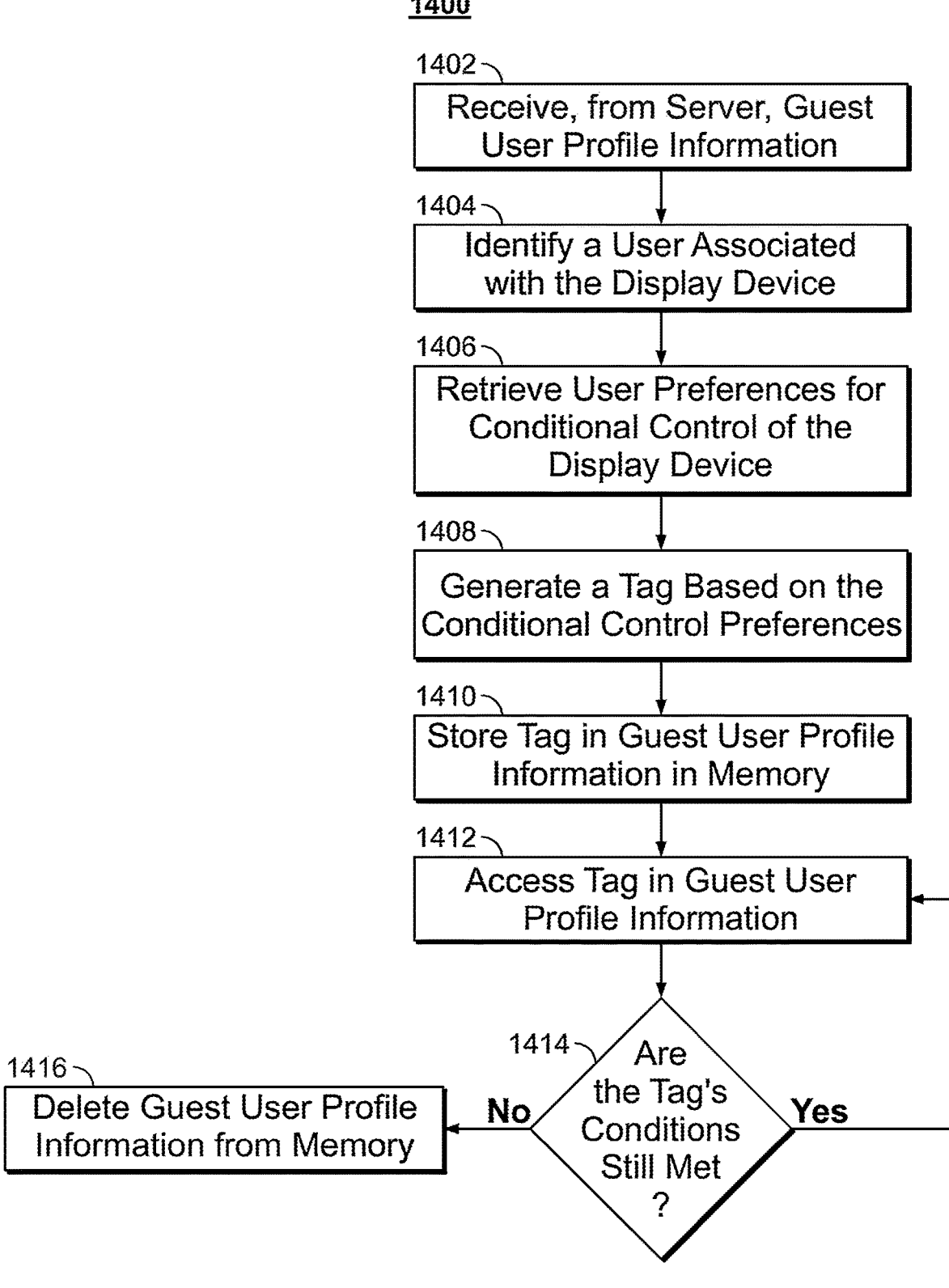

1400

1402 — Receive, from Server, Guest User Profile Information

1404 — Identify a User Associated with the Display Device

1406 — Retrieve User Preferences for Conditional Control of the Display Device

1408 — Generate a Tag Based on the Conditional Control Preferences

1410 — Store Tag in Guest User Profile Information in Memory

1412 — Access Tag in Guest User Profile Information

1414 — Are the Tag's Conditions Still Met?

No

Yes

1416 — Delete Guest User Profile Information from Memory

FIG. 14

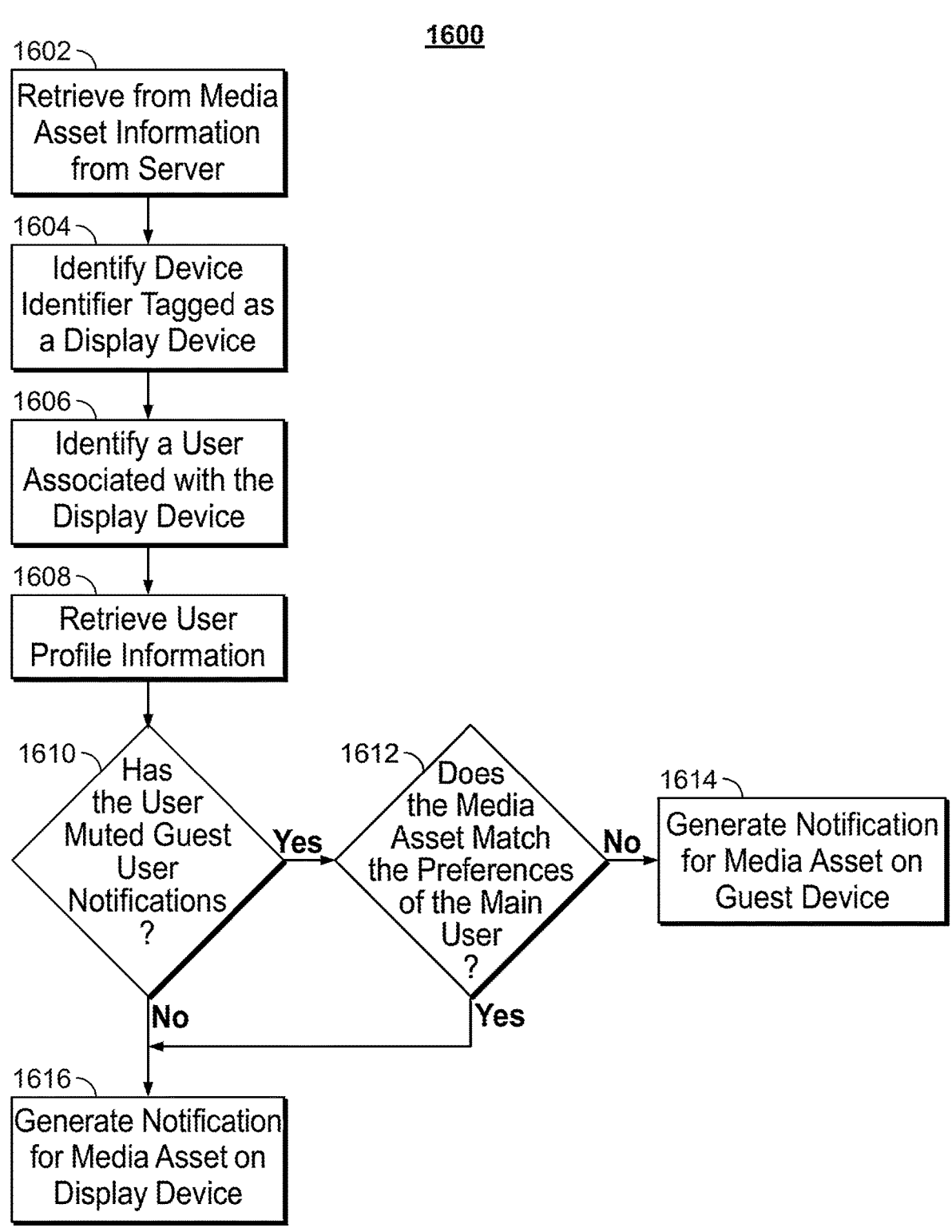

1600

1602 — Retrieve from Media Asset Information from Server

1604 — Identify Device Identifier Tagged as a Display Device

1606 — Identify a User Associated with the Display Device

1608 — Retrieve User Profile Information

1610 — Has the User Muted Guest User Notifications?

1612 — Does the Media Asset Match the Preferences of the Main User?

1614 — Generate Notification for Media Asset on Guest Device

1616 — Generate Notification for Media Asset on Display Device

FIG. 16

METHODS AND SYSTEMS FOR GENERATING NOTIFICATIONS BASED ON THE INTERESTS OF GUESTS

CROSS-REFERENCE TO RELATED APPLICATIONS

This application is a continuation application of U.S. application Ser. No. 17/964,320, filed Oct. 12, 2022, which is a continuation application of U.S. application Ser. No. 17/326,550, filed May 21, 2021, now U.S. Pat. No. 11,503, 374, which is a continuation application of U.S. application Ser. No. 16/623,098, filed Dec. 16, 2019, now U.S. Pat. No. 11,044,527, which is a national stage application under 35 U.S.C. § 371 of International Application PCT/US2017/040373, filed Jun. 30, 2017. The disclosure of which are hereby incorporated by reference herein in their entireties.

BACKGROUND

In our connected world, it is common for a user to set settings for controlling notifications on his own television or display device. In these situations, the user is affecting the settings on his user account and can control the other devices associated with that account. However, when guests use the user's television or display device, the guests have no ability to set any of these functions while they are using those same devices. For example, a group of friends gather in an apartment for dinner and the news is on the television. In this example, the user who's hosting this dinner can set any number of notifications, but any of his friends, who may be missing his sports games or shows, cannot connect to his device temporarily to see his notifications while they are at this dinner. Guests, upon visiting another user, are unable to request notifications on the main display device for shows of interest to be displayed while visiting the other user.

SUMMARY

Methods and systems are provided herein for generating notifications based on the interests of guests. Guests may request notifications on their host's television, and the system will generate notifications based on the guest's interests and preferences as stored in the guest's user profile. In doing so, the guest will be notified of events of interest, such as when a favorite sports team scores a point or when an important scene in a favorite movie is playing. The system monitors the network of the apartment or house and detects when a guest device is accessing the network. The system then accesses the guest's interests and identifies a set of programs based on these interests. The system then monitors these programs and generates notifications on the display device when an event of interest to the guest has occurred in one of the identified programs.

In some aspects, the media guidance application detects a device accessing a network. For example, the media guidance application may detect a cell phone connecting to the local area network (LAN). The media guidance application transmits, to the server, a request for a set of device identifiers associated with the network. For example, the media guidance application may request from the server a list of cell phones, mobile devices, and laptops that are identified as having previously accessed the network on a regular basis (e.g., devices that have previously accessed the network within a predetermined time interval) or at a rate exceeding a specified frequency. The media guidance application receives, from the server, the set of device identifiers, where one of the device identifiers of the set of device identifiers represents a display device. The display device may be a device that displays content to multiple users (e.g., a shared display device). For example, the media guidance application may receive, for a network associated with a house, a list of device identifiers that includes each resident's cell phone and laptop, as well as the smart televisions.

In some embodiments, the network is a local area network and the set of device identifiers associated with the network represents a set of devices identified as accessing the network frequently or regularly. The media guidance application may monitor the network. For example, the media guidance application may monitor the local area network for the various cell phones, mobile devices, and laptops that may access it. The media guidance application may measure a frequency of access for each device that accesses the network. For example, the media guidance application may record each time a specific cell phone connects to the LAN and calculate a regular frequency for that cell phone over a time period, such as a weekly or monthly frequency. As a specific example, the media guidance application records whether the cell phone connects to the LAN every day for five hours, in which case the frequency is once a day, or connects to the LAN once a week for only two hours. The media guidance application may compare the frequency of access for each device that accesses the network to a threshold. The media guidance application may then, based on the comparing, determine that the frequency of access for a new device is above a threshold. For example, the threshold may be any device which connects to the LAN at least once every other day. The identified cell phone may access the LAN daily and so may exceed the threshold. In another example, the identified cell phone may access the LAN only once a week and so fail to exceed the threshold. The media guidance application may add a new device identifier associated with the new device to the set of device identifiers. For example, the identified cell phone that has been determined to connect to the LAN at a frequency above the threshold may be added to a list of device identifiers that regularly accesses the network.

The media guidance application retrieves a device identifier for the device accessing the network. For example, the media guidance application may detect a cell phone connecting with the LAN and retrieve the cellphone's device ID. A device ID may be a mac address, IP address, phone number, or other unique identifier. The media guidance application compares each of the set of device identifiers to the retrieved device identifier. For example, the media guidance application may compare the cellphone's device ID to the list of devices associated with the house. The media guidance application, in response to comparing, determines that the retrieved device identifier does not match any of the device identifiers in the set of device identifiers. For example, the media guidance application may determine that the cell phone is not on the list of devices associated with the house because this is the first time the cell phone has connected to the LAN.

The media guidance application identifies the device associated with the device identifier as a guest device. For example, the media guidance application tags the cell phone's device ID as a guest device. In some embodiments, the media guidance application may identify the device associated with the device identifier as a guest device by retrieving, from the server, contact information associated with the set of device identifiers, searching for the detected device identifier in the retrieved contact information and, based on the searching, determining that the detected device identifier represents the guest device. For example, the media guidance application may access the contact list from the cell phone for each resident of the house and check the contact lists for an entry associated with the detected cell phone and, based on determining that this cell phone is associated with one of the entries in one of the contact lists, then tag the cell phone's device ID as a guest device.

In some embodiments, the media guidance application may verify whether the device associated with the device identifier is a guest device or a new device associated with the user by detecting a user account associated with the device. For example, the user may bring home a new device that has not yet accessed the network, and be prompted to login with a username that connects the device to the user's account. In this specific example, the new device would not be identified as a guest device, even though the device is new, because it is associated with a user account that has other devices which are already identified as accessing the network regularly. In some embodiments, the media guidance application may determine a list of user accounts associated with each device identifier in the set of device identifiers, search the list of user accounts for the detected user account, and, based on the search, add the device ID for the identified device to the set of device identifiers. For example, the media guidance application may determine a list of user accounts based on the user accounts associated with each laptop that regularly accesses the network, so that when a user buys a new laptop associated with one of the listed user accounts, the media guidance application automatically identifies the laptop and adds the laptop to the list of devices associated with the network.

The media guidance application accesses, via a database of user profiles, a guest user profile associated with the guest device. For example, the media guidance application may search the database of user profiles for a profile associated with the cell phone's device ID. The media guidance application registers the guest user profile as a profile with limited control of the display device. For example, the media guidance application may tag the guest user profile as a profile that has limited permissions to control the smart television in the house. The media guidance application, in response to registering the guest user profile as the profile with limited control, receives a request for notifications from a guest user profile. For example, once the guest profile has been marked as a profile with limited access, the guest may be able to use his cell phone to request notifications on the smart television. The media guidance application retrieves, from the guest user profile, a set of interests. For example, the media guidance application may access the guest's user profile to find the guest's interests such as favorite sports teams, genres, or channels.

The media guidance application determines a set of media assets currently available that match the set of interests from the guest user profile. For example, the media guidance application may, based on the guest's user profile, identify a sports game currently playing based on the guest's favorite team or may identify a movie about to start based on the guest's favorite actor. In another example, the guest's user profile may include account information for other social networks, such as Twitter, and determine the programs and interests of the user based on who the guest follows on these social networks, such as Twitter. In some embodiments, the media guidance application may determine a set of media assets currently available by retrieving a list of favorite media assets associated with the guest user profile, retrieving a schedule of recordings associated with the guest user profile, and searching a program guide schedule for a media asset that matches at least one of 1) a media asset on the list of favorites, 2) a media asset on the schedule of recordings, or 3) a media asset in the set of interests of the user. For example, the media guidance application may search the program guide for programs currently playing or about to start for programs that match items on the guest's favorites list such as a favorite movie. In another example, the media guidance application may search the program guide for programs that the guest has scheduled to record on his home DVR. In yet another example, the media guidance application may search for a television show in the program guide because the guest follows the official account for the show on a social network such as Twitter.

The media guidance application monitors the set of media assets for an event of interest to the guest. For example, the media guidance application may monitor the programs identified as programs of interest to determine what is happening in each program. The media guidance application determines whether the event of interest to a user associated with the guest user profile has occurred in one of the media assets in the set of media assets. For example, the media guidance application may receive from a server a set of timestamps for a movie, where each timestamp is a favorite scene for that movie. If the program has reached one of these timestamps or is about to reach one of these timestamps, the media guidance application may determine that an event of interest to the guest is occurring. In some embodiments, the media guidance application may monitor social media posts associated with the media assets, and determine whether the event of interest to the guest has occurred comprises determining that one of the set of media assets is referenced in a number of the social media posts that exceeds a threshold. For example, the media guidance application may monitor a social network such as Twitter and determine if a certain event is trending. If an event is trending on the social network, the media guidance application may determine that it is an event of interest to the guest as well.

The media guidance application generates for display, on the display device, a notification indicating the event of interest to the guest and the media asset. The display device may be a device displaying content to multiple users and may be a device associated with another user's profile. For example, the media guidance application may generate a notification on the television that the guest's favorite team has just scored in the on-going sports game. In some embodiments, the media guidance application may receive a user selection of the generated notification from the guest device and then may generate for display, on the display device, the media asset associated with the selected notification. For example, the media guidance application may allow the guest to select the notification indicating that the guest's favorite team has just scored a point and then have the television tune to the sports game. In some embodiments, the media guidance application may receive a user selection, from the guest device, to rewind the media asset to the event of interest to the guest. The media guidance application may generate for display, on the display device, the media asset from the event of interest to the guest. For example, the media guidance application may, upon tuning to the sports game, play the game from a timestamp before the point was scored instead of tuning to the live program.

In some embodiments, the media guidance application may detect that the guest device is no longer connected to the network. For example, the media guidance application may determine that the guest's cell phone is no longer accessing the LAN. The media guidance application may delete the guest user profile as the profile with limited control of the display device. The media guidance application may terminate the monitoring of the set of media assets for the event of interest to the guest. For example, the media guidance application may remove the guest's user profile permissions to request notifications for the television and may discontinue any notifications relating to that guest's interests.

In some embodiments, the media guidance application may receive a user selection, from the guest device, to terminate notifications. For example, the media guidance application may receive an instruction from guest's cell phone to discontinue the notifications. The media guidance application may delete the guest user profile as the profile with limited control of the display device. The media guidance application, in response to receiving the user selection, may terminate the monitoring of the set of media assets for the event of interest to the guest. For example, the media guidance application may remove the guest's user profile permissions to request notifications for the television and may discontinue any notifications relating to that guest's interests.

In some embodiments, the media guidance application receives a user selection, from a device associated with a device identifier from the set of device identifiers, to mute notifications from the profile with limited control of the display device. For example, a user with a laptop that regularly accesses the LAN for this house may select the controls to stop notifications requested from guests. The media guidance application, in response to receiving the user selection, may terminate the monitoring of the set of media assets for the event of interest to the guest. For example, the media guidance application may discontinue any notifications relating to that guest's interests.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 7 is a flowchart of illustrative steps involved in generating for display notifications based on the interests of guests, in accordance with some embodiments of the disclosure;

FIG. 8 is another flowchart of illustrative steps involved in generating for display notifications based on the interests of guests, in accordance with some embodiments of the disclosure;

FIG. 14 is a flowchart of illustrative steps involved in identifying the device associated with the device identifier as a guest device, in accordance with some embodiments of the disclosure;

FIG. 16 is a flowchart of illustrative steps involved in generating for display, on the display device, a notification indicating the event of interest and the media asset, in accordance with some embodiments of the disclosure.

DETAILED DESCRIPTION

Figure 1:
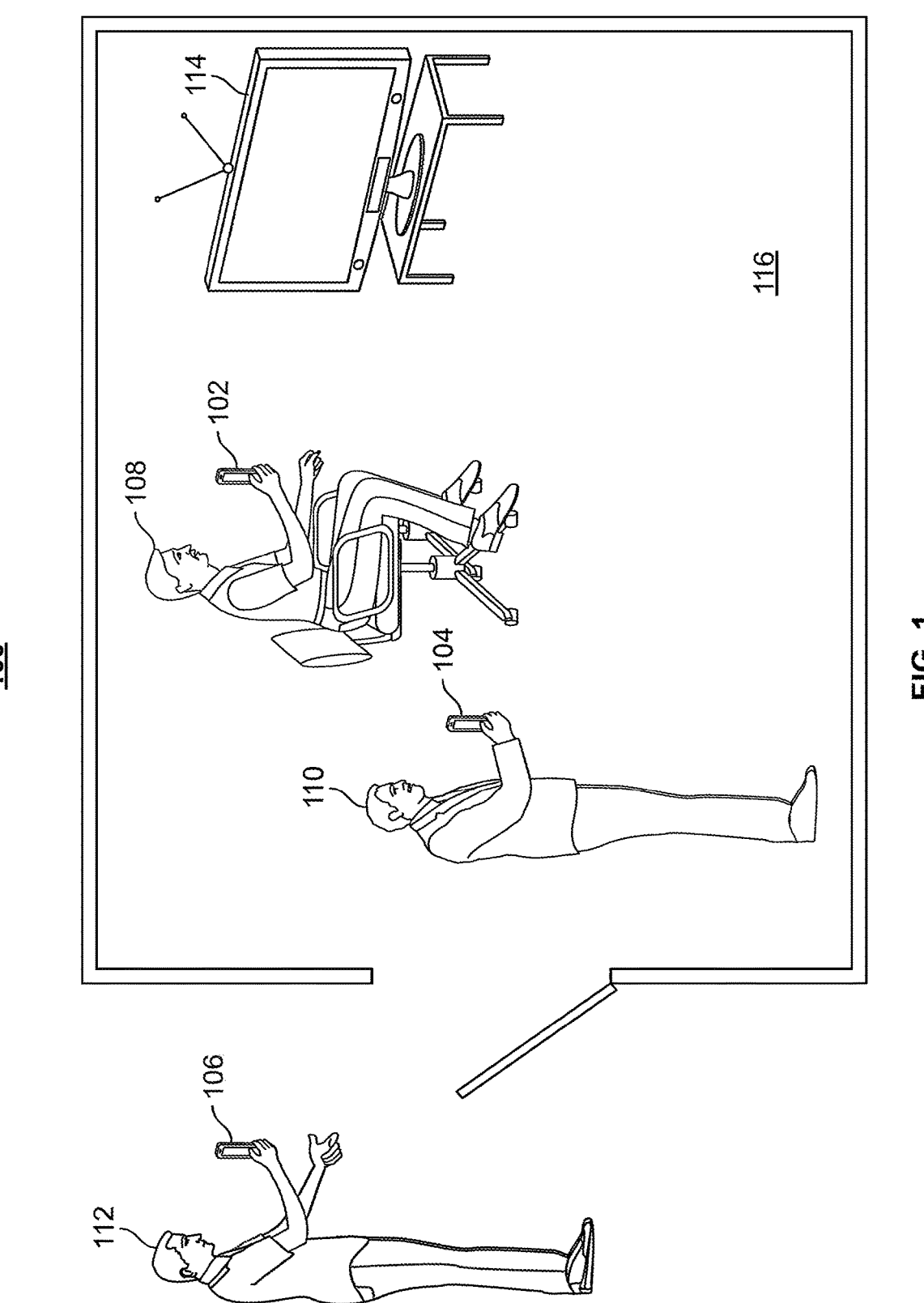
FIG. 1 shows an illustrative embodiment of user devices connecting to the network to access control of the display device, in accordance with some embodiments of the disclosure.

Methods and systems are provided herein for generating notifications based on the interests of guests. Guests may request notifications on their host's television, and the system will generate notifications based on the guest's interests and preferences as stored in the guest's user profile. In doing so, the guest will be notified of events of interest, such as when a favorite sports team scores a point or when an important scene in a favorite movie is playing. The system monitors the network of the apartment or house and detects when a guest device is accessing the network. The system then accesses the guest's interests and identifies a set of programs based on these interests. The system then monitors these programs and generates notifications on the display device when an event of interest to the guest has occurred in one of the identified programs.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (e.g., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

As referred to herein, a "guest" is a person with a user account and user profile on the server and/or on his guest device who is temporarily visiting a location associated with a network of another user with a different user account and user profile and which does not have a record of the guest user account and/or profile. For example, a guest is a person who is visiting a friend's home at which the device of the friend does not have an account or profile set up for the guest. A "guest device" is a device associated with the guest, the guest's account and/or profile.

FIG. 1 shows an illustrative embodiment of user devices connecting to the network to access control of the display device, in accordance with some embodiments of the disclosure. User devices 102, 104, and 106 are associated with users 108, 110, and 112 respectively. User devices 102, 104, and 106, as well as display device 114 connect to network 116.

In some embodiments, the media guidance application detects a user device 102 accessing a network 116. For example, the media guidance application may detect a cell phone (e.g., user device 102) connecting to the local area network (LAN) (e.g., network 116). The media guidance application transmits, to the server, a request for a set of device identifiers associated with the network 116. For example, the media guidance application may request from the server a list of cell phones, mobile devices, and laptops that are identified as having previously accessed the network 116 on a regular basis (e.g., devices that have previously accessed the network within a predetermined time interval) or at a rate exceeding a specified frequency. The media guidance application receives, from the server, the set of device identifiers, where one of the device identifiers of the set of device identifiers represents display device 114. The display device 114 may be a device that displays content to multiple users (e.g., a shared display device). For example, the media guidance application may receive, for a network associated with a house (e.g., network 116), a list of device identifiers that includes each resident's cell phone (e.g., user devices 102 and 106) and laptop, as well as the smart televisions (e.g., display device 114).

In some embodiments, the network 116 is a local area network and the set of device identifiers associated with the network represents a set of devices identified as accessing the network frequently or regularly. The media guidance application may monitor the network 116. For example, the media guidance application may monitor the local area network for the various cell phones, mobile devices, and laptops that may access it. The media guidance application may measure a frequency of access for each device (e.g., user devices 102 and 106) that accesses the network 116. For example, the media guidance application may record each time a specific cell phone connects to the LAN and calculate a regular frequency for that cell phone over a time period, such as a weekly or monthly frequency. As a specific example, the media guidance application records whether the cell phone connects to the LAN every day for five hours, in which case the frequency is once a day, or connects to the LAN once a week for only two hours. The media guidance application may compare the frequency of access for each device (e.g., user devices 102 and 106) that accesses the network 116 to a threshold. The media guidance application may then, based on the comparing, determine that the frequency of access for a new device (e.g., user devices 102 and 106) is above a threshold. For example, the threshold may be any device which connects to the LAN (e.g., network 116) at least once every other day. The identified cell phone (e.g., user device 102) may access the LAN (e.g., network 116) daily and so exceed the threshold. In another example, the identified cell phone (e.g., user device 106) may access the LAN (e.g., network 116) only once a week and so fail to exceed the threshold. The media guidance application may add a new device identifier associated with the new device (e.g., user device 102) to the set of device identifiers. For example, the identified cell phone that has been determined to connect to the LAN at a frequency above the threshold may be added to a list of device identifiers that regularly accesses the network 116.

The media guidance application retrieves a device identifier for the device (e.g., user device 104) accessing the network 116. For example, the media guidance application may detect a cell phone connecting with the LAN and retrieve the cellphone's device ID. A device ID may be a mac address, IP address, phone number, or other unique identifier. The media guidance application compares each of the set of device identifiers to the retrieved device identifier. For example, the media guidance application may compare the cellphone's device ID to the list of devices associated with the house. The media guidance application, in response to comparing, determines that the retrieved device identifier does not match any of the device identifiers in the set of device identifiers. For example, the media guidance application may determine that the cell phone is not on the list of devices associated with the house because this is the first time the cell phone has connected to the LAN.

The media guidance application identifies the device 104 associated with the device identifier as a guest device. For example, the media guidance application tags the cell phone's device ID as a guest device. In some embodiments, the media guidance application may identify the device 104 associated with the device identifier as a guest device by retrieving, from the server, contact information associated with the set of device identifiers, searching for the detected device identifier in the retrieved contact information and, based on the searching, determining that the detected device identifier represents the guest device. For example, the media guidance application may access the contact list from the cell phone (e.g., user devices 102 and 106) for each resident of the house (e.g., users 108 and 112) and check the contact lists for an entry associated with the detected cell phone and, based on determining that this cell phone (e.g., user device 104) is associated with one of the entries in one of the contact lists (e.g., user 110), then tag the cell phone's device ID as a guest device.

In some embodiments, the media guidance application may verify whether the device 104 associated with the device identifier is a guest device or a new device associated with user 112 of the network by detecting a user account associated with the device. For example, user 112 may bring home a new device (e.g., user device 106) that has not yet accessed network 116, and be prompted to login with a username that connects the device to the user's account. In this specific example, the new device (e.g., user device 106) would not be identified as a guest device, even though the device is new, because it is associated with a user account that has other devices which are already identified as accessing the network regularly. In some embodiments, the media guidance application may determine a list of user accounts associated with each device identifier in the set of device identifiers, search the list of user accounts for the detected user account, and, based on the search, add the device ID for the identified device to the set of device identifiers. For example, the media guidance application may determine a list of user accounts based on the user accounts associated with each laptop that regularly accesses the network, so that when a user buys a new laptop associated with one of the listed user accounts, the media guidance application automatically identifies the laptop and adds the laptop to the list of devices associated with the network 116.

The media guidance application accesses, via a database of user profiles, a guest user profile associated with the guest device (e.g., user device 104). For example, the media guidance application may search the database of user profiles for a profile associated with the cell phone's device ID. The media guidance application registers the guest user profile as a profile with limited control of the display device 114. For example, the media guidance application may tag the guest user profile as a profile that has limited permissions to control the smart television (e.g., display device 114) in the house. The media guidance application, in response to registering the guest user profile as the profile with limited control, receives a request for notifications from a guest user profile. For example, once the guest profile has been marked as a profile with limited access, the guest (e.g., user 110) may be able to use his cell phone (e.g., user device 104) to request notifications on the smart television (e.g., display device 114) or perform a limited set of guest functions (e.g., control volume and change channels but not purchase content). The media guidance application retrieves, from the guest user profile, a set of interests. For example, the media guidance application may access the guest's user profile to find the guest's interests such as favorite sports teams, genres, or channels.

The media guidance application determines a set of media assets currently available that match the set of interests of the user (e.g., user 110) from the guest user profile. For example, the media guidance application may, based on the guest's user profile, identify a sports game currently playing based on the guest's favorite team or may identify a movie about to start based on the guest's favorite actor. In another example, the guest's user profile may include account information for other social networks, such as Twitter, and determine the programs and interests of the user (e.g., user 110) based on who the guest follows on these social networks, such as Twitter. In some embodiments, the media guidance application may determine a set of media assets currently available by retrieving a list of favorite media assets associated with the guest user profile, retrieving a schedule of recordings associated with the guest user profile, and searching a program guide schedule for a media asset that matches at least one of 1) a media asset on the list of favorites, 2) a media asset on the schedule of recordings, or 3) a media asset in the set of interests of the user (e.g., user 110). For example, the media guidance application may search the program guide for programs currently playing or about to start for programs that match items on the guest's favorites list such as a favorite movie. In another example, the media guidance application may search the program guide for programs that the guest has scheduled to record on his home DVR. In yet another example, the media guidance application may search for a television show in the program guide because the guest follows the official account for the show on a social network such as Twitter.

The media guidance application monitors the set of media assets for an event of interest to the user (e.g., user 110). For example, the media guidance application may monitor the programs identified as programs of interest to determine what is happening in each program. The media guidance application determines whether the event of interest to a user (e.g., user 110) associated with the guest user profile has occurred in one of the media assets in the set of media assets. For example, the media guidance application may receive from a server a set of timestamps for a movie, where each timestamp is a favorite scene for that movie. If the program has reached one of these timestamps or is about to reach one of these timestamps, the media guidance application may determine that an event of interest is occurring. In some embodiments, the media guidance application may monitor social media posts associated with the media assets, and determine whether the event of interest has occurred by determining that one of the set of media assets is referenced in a number of the social media posts that exceeds a threshold. For example, the media guidance application may monitor a social network such as Twitter and determine if a certain event is trending. If an event is trending on the social network, the media guidance application may determine that it is an event of interest to the guest (e.g., user 110) as well.

The media guidance application generates for display, on the display device 114, a notification indicating the event of interest and the media asset. The display device 114 may be a device displaying content to multiple users and may be a device associated with another user's profile. For example, the media guidance application may generate a notification on the television (e.g., display device 114) that the guest's favorite team has just scored in the on-going sports game. In some embodiments, the media guidance application may receive a user selection of the generated notification from the guest device (e.g., user device 104) and then may generate for display, on the display device 114, the media asset associated with the selected notification. For example, the media guidance application may allow the guest (e.g., user 110) to select the notification indicating that the guest's favorite team has just scored a point and then have the television (e.g., display 114) tune to the sports game. In some embodiments, the media guidance application may receive a user selection, from the guest device (e.g., user device 104), to rewind the media asset to the event of interest. The media guidance application may generate for display, on the display device 114, the media asset from the event of interest. For example, the media guidance application may, upon tuning to the sports game, play the game from a timestamp before the point was scored instead of tuning to the live program.

In some embodiments, the media guidance application may detect that the guest device (e.g., user device 104) is no longer connected to the network 116. For example, the media guidance application may determine that the guest's cell phone (e.g., user device 104) is no longer accessing the LAN (e.g., network 116). The media guidance application may delete the guest user profile as the profile with limited control of the display device 114. The media guidance application may terminate the monitoring of the set of media assets for the event of interest. For example, the media guidance application may remove the guest's user profile permissions to request notifications for the television and may discontinue any notifications relating to that guest's interests.

In some embodiments, the media guidance application may receive a user selection, from the guest device (e.g., user device 104), to terminate notifications. For example, the media guidance application may receive an instruction from guest's cell phone (e.g., user device 104) to discontinue the notifications. The media guidance application may delete the guest user profile as the profile with limited control of the display device 114. The media guidance application, in response to receiving the user selection, may terminate the monitoring of the set of media assets for an event of interest to user 110. For example, the media guidance application may remove the guest's user profile permissions to request notifications for the television and may discontinue any notifications relating to that guest's interests.

In some embodiments, the media guidance application receives a user selection, from a device associated with a device identifier from the set of device identifiers (e.g., user device 102), to mute notifications from the profile with limited control of the display device 114. For example, a user with a laptop that regularly accesses the LAN for this house may select the controls to stop notifications requested from guests (e.g., user 110). The media guidance application, in response to receiving the user selection, may terminate the monitoring of the set of media assets for the event of interest. For example, the media guidance application may discontinue any notifications relating to that guest's interests.

Figure 2:
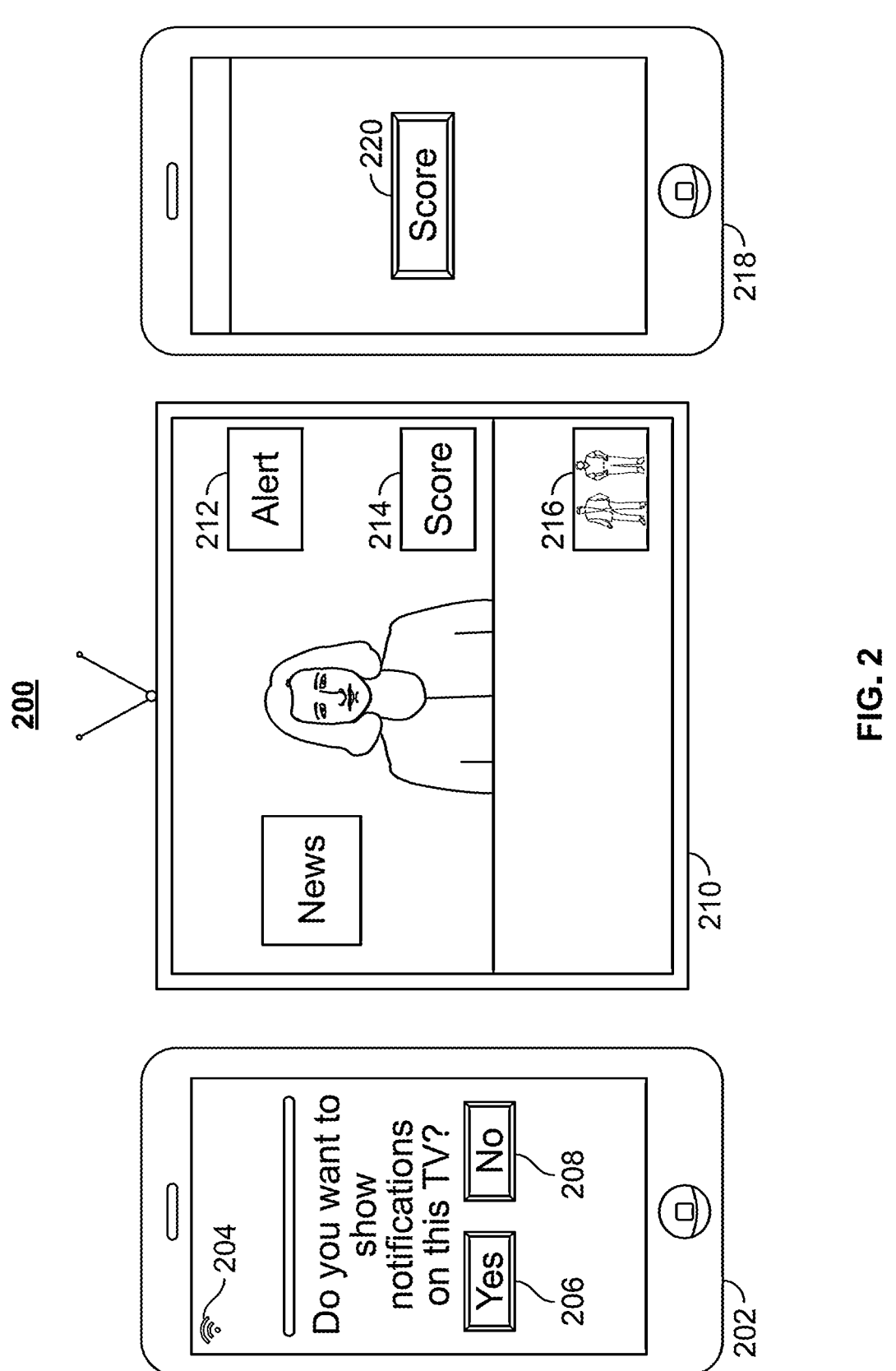
FIG. 2 shows another illustrative embodiment of display screens that may be used to generate notifications based on the interests of guests, in accordance with some embodiments of the disclosure.

FIG. 2 shows another illustrative embodiment of display screens that may be used to generate notifications based on the interests of guests, in accordance with some embodiments of the disclosure. User device 202 is connected to network 204 and displays, to the user, selectable options 206 and 208. Display device 210 shows notifications 212, 214, and 216. User device 218 displays notification 220. Notification 220 may match notification 214.

The media guidance application generates for display, on the display device 210, a notification (e.g., notifications 212, 214, and 216) indicating the event of interest and the media asset. The display device 210 may be a device displaying content to multiple users and may be a device associated with another user's profile. For example, the media guidance application may generate a notification (e.g., notifications 212, 214, and 216) on the television (e.g., display device 210) that the guest's favorite team has just scored in the on-going sports game (e.g., notification 214). In some embodiments, notifications that are provided based on the guest profile (e.g., the guest's team just scored) may be visually distinguished (e.g., the notification may include a textual or visual representation of the guest) from notifications provided based on a profile or device that regularly accesses the network. In some embodiments, the media guidance application may receive a user selection of the generated notification (e.g., notification 220) from the guest device (e.g., user device 218) and then may generate for display, on the display device 210, the media asset associated with the selected notification (e.g., notification 220). For example, the media guidance application may allow the guest to select the notification (e.g., notification 220) indicating that the guest's favorite team has just scored a point and then have the television (e.g., display device 210) tune to the sports game. In some embodiments, the media guidance application may receive a user selection, from the guest device (e.g., user devices 202 or 218), to rewind the media asset to the event of interest. The media guidance application may generate for display, on the display device 210, the media asset from the event of interest. For example, the media guidance application may, upon tuning to the sports game, play the game from a timestamp before the point was scored instead of tuning to the live program.

In some embodiments, the media guidance application may detect that the guest device (e.g., user device 202) is no longer connected to the network 204. For example, the media guidance application may determine that the guest's cell phone is no longer accessing the LAN. The media guidance application may delete the guest user profile as the profile with limited control of the display device 210. The media guidance application may terminate the monitoring of the set of media assets for the event of interest. For example, the media guidance application may remove the guest's user profile permissions to request notifications for the television (e.g., display device 210) and may discontinue any notifications relating to that guest's interests.

In some embodiments, the media guidance application may receive a user selection, from the guest device (e.g., user device 202), to terminate notifications. For example, the media guidance application may receive an instruction from guest's cell phone (e.g., user device 202) to discontinue the notifications. The media guidance application may delete the guest user profile as the profile with limited control of the display device 210. The media guidance application, in response to receiving the user selection, may terminate the monitoring of the set of media assets for an event of interest. For example, the media guidance application may remove the guest's user profile permissions to request notifications for the television (e.g., display device 210) and may discontinue any notifications relating to that guest's interests.

In some embodiments, the media guidance application receives a user selection, from a device associated with a device identifier from the set of device identifiers, to mute notifications from the profile with limited control of the display device 210. For example, a user with a laptop that regularly accesses the LAN for this house may select the controls to stop notifications requested from guests. The media guidance application, in response to receiving the user selection, may terminate the monitoring of the set of media assets for the event of interest. For example, the media guidance application may discontinue any notifications relating to that guest's interests.

Figures 3, 4:
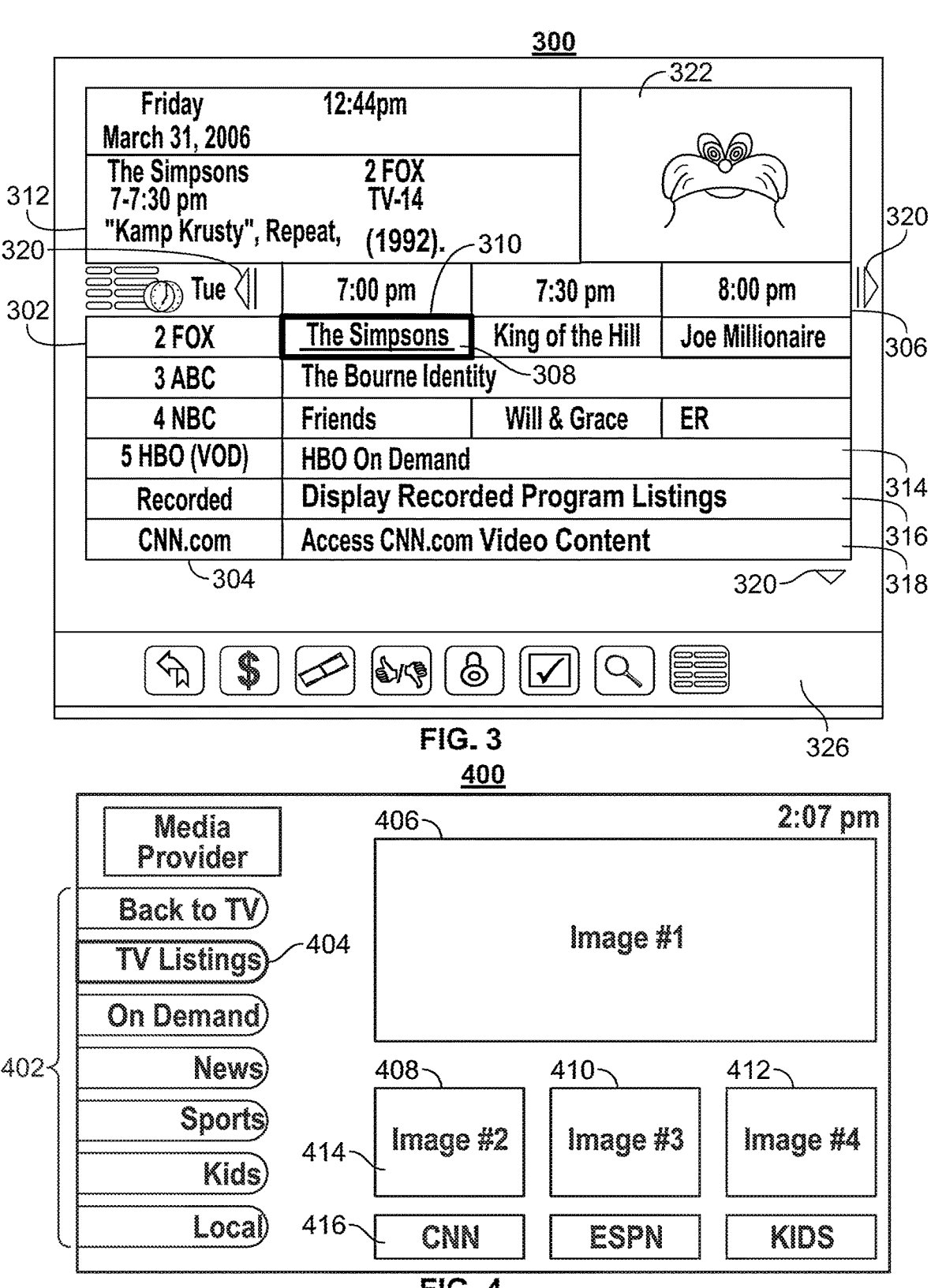
FIG. 3 shows an illustrative embodiment of a display screen that may be used to provide media guidance application listings and other media guidance information, in accordance with some embodiments of the disclosure.
FIG. 4 shows another illustrative embodiment of a display screen that may be used to provide media guidance application listings, in accordance with some embodiments of the disclosure.

FIGS. 3-4 show illustrative display screens that may be used to provide media guidance data in accordance with some embodiments of the disclosure. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/ or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (e.g., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
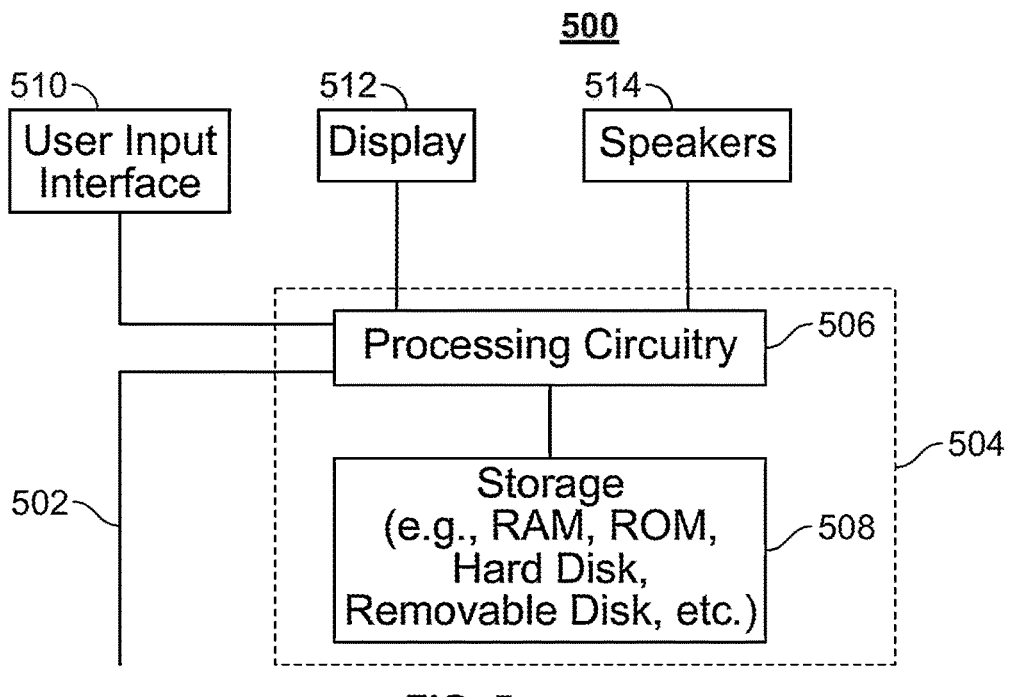
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (e.g., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
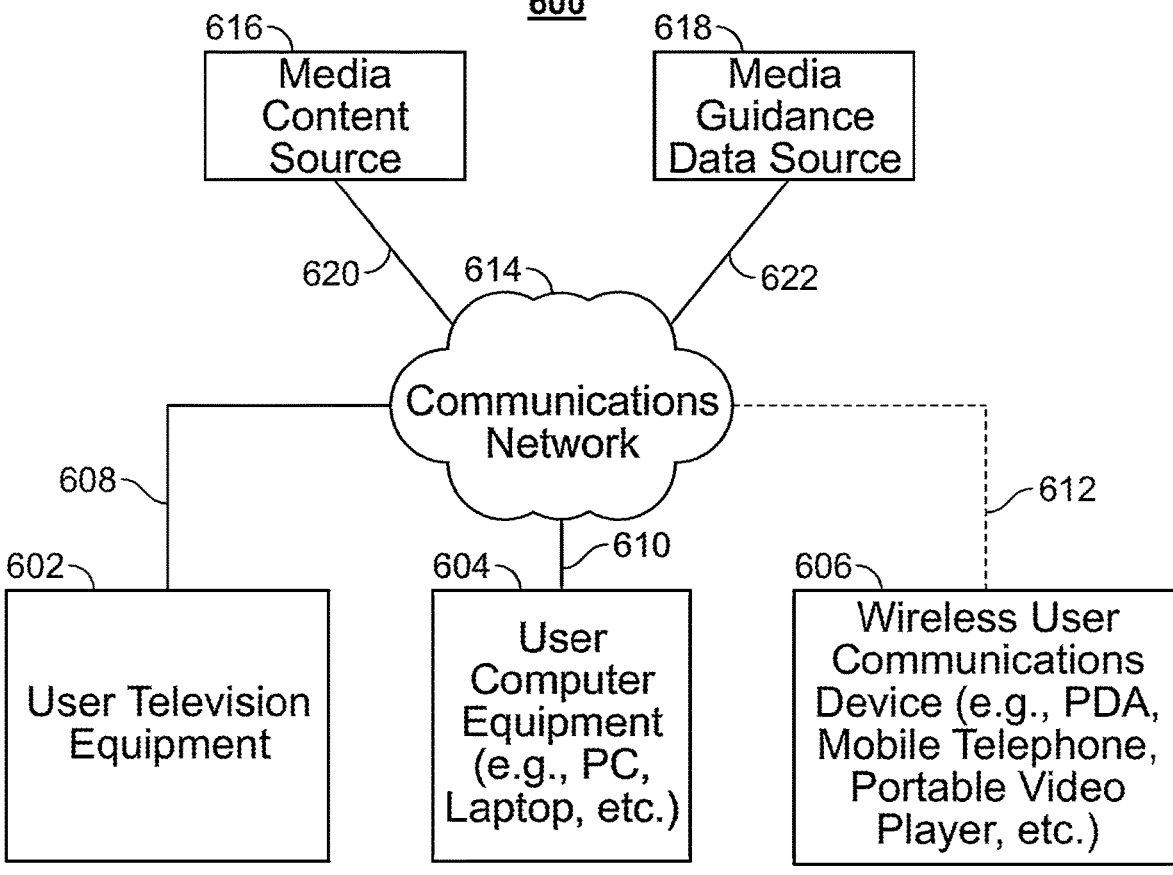
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, e.g., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

FIG. 7 is a flowchart of illustrative steps involved in generating for display notifications based on the interests of guests, in accordance with some embodiments of the disclosure.

At 702, control circuitry 504 monitors a set of device identifiers associated with a household, where the household is associated with a plurality of user profiles and where the set of devices includes display device 114. The display device 114 may be a device that displays content to multiple users (e.g., a shared display device). For example, control circuitry 504 may detect a cell phone (e.g., user device 102) connecting to the local area network (LAN) (e.g., network 116) and identify the device identifier. In another example, control circuitry 504 may identify a set of device identifiers that includes each resident's cell phone (e.g., user devices 102 and 106) and laptop, as well as the smart televisions (e.g., display device 114). Process 700 proceeds to 704.

At 704, control circuitry 504 detects a guest device that is associated with a guest user profile, where the guest user profile is not one of the plurality of user profiles associated with the household. For example, control circuitry 504 may determine that the detected cell phone is not on the list of devices associated with the house because this is the first time the cell phone has connected to the LAN. Process 700 proceeds to 706.

At 706, control circuitry 504 registers the guest user profile as a profile with limited control of the display device 114. For example, control circuitry 504 may tag the guest user profile as a profile that has limited permissions to control the smart television (e.g., display device 114) in the house. For example, the guest device may have permission to change the volume of display device 114 or change the channels but may not have permission to purchase content. Process 700 proceeds to 708.

At 708, control circuitry 504, in response to registering the guest user profile as the profile with limited control, receives a request for notifications from a guest user profile. For example, once the guest profile has been marked as a profile with limited access, the guest (e.g., user 110) may be able to use his cell phone (e.g., user device 104) to request notifications on the smart television (e.g., display device 114). Process 700 proceeds to 710.

At 710, control circuitry 504 retrieves, from the guest user profile, a set of interests. For example, control circuitry 504 may access the guest's user profile to find the guest's interests such as favorite sports teams, genres, or channels. Process 700 proceeds to 712.

At 712, control circuitry 504 determines a set of media assets currently available that match the set of interests of the user (e.g., user 110) from the guest user profile. For example, control circuitry 504 may, based on the guest's user profile, identify a sports game currently playing based on the guest's favorite team or may identify a movie about to start based on the guest's favorite actor. In another example, the guest's user profile may include account information for other social networks, such as Twitter, and determine the programs and interests of the user (e.g., user 110) based on who the guest follows on these social networks, such as Twitter. Process 700 proceeds to 714.

At 714, control circuitry 504 determines whether the event of interest to a user (e.g., user 110) associated with the guest user profile has occurred in one of the media assets in the set of media assets. For example, control circuitry 504 may receive from a server a set of timestamps for a movie, where each timestamp is a favorite scene of the guest for that movie. If the program has reached one of these timestamps or is about to reach one of these timestamps, control circuitry 504 may determine that an event of interest to the guest is occurring. Process 700 proceeds to 716.

At 716, control circuitry 504 generates for display, on the display device 114, a notification indicating the event of interest and the media asset. The display device 114 may be a device displaying content to multiple users and may be a device associated with another user's profile. For example, control circuitry 504 may generate a notification on the television (e.g., display device 114) that the guest's favorite team has just scored in the on-going sports game.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 7.

FIG. 8 is another flowchart of illustrative steps involved in generating for display notifications based on the interests of guests, in accordance with some embodiments of the disclosure.

At 802, control circuitry 504 detects a user device 102 accessing a network 116. For example, control circuitry 504 may detect a cell phone (e.g., user device 102) connecting to the local area network (LAN) (e.g., network 116). Process 800 proceeds to 804.

At 804, control circuitry 504 transmits, to the server, a request for a set of device identifiers associated with the network 116. For example, control circuitry 504 may request from the server a list of cell phones, mobile devices, and laptops that are identified as having previously accessing the network 116 on a regular basis (e.g., devices that have previously accessed the network within a predetermined time interval) or at a rate exceeding a specified frequency. Process 800 proceeds to 806.

At 806, control circuitry 504 receives, from the server, the set of device identifiers, where one of the device identifiers of the set of device identifiers represents display device 114. The display device 114 may be a device that displays content to multiple users (e.g., a shared display device). For example, control circuitry 504 may receive, for a network associated with a house (e.g., network 116), a list of device identifiers that includes each resident's cell phone (e.g., user devices 102 and 106) and laptop, as well as the smart televisions (e.g., display device 114). Process 800 proceeds to 808.

At 808, control circuitry 504 retrieves a device identifier for the device (e.g., user device 104) accessing the network 116. For example, control circuitry 504 may detect a cell phone connecting with the LAN and retrieve the cellphone's device ID. A device ID may be a mac address, IP address, phone number, or other unique identifier. Process 800 proceeds to 810.

At 810, control circuitry 504 compares each of the set of device identifiers to the retrieved device identifier. For example, control circuitry 504 may compare the cellphone's device ID to the list of devices associated with the house. Process 800 proceeds to 812.

At 812, control circuitry 504, in response to comparing, determines that the retrieved device identifier does not match any of the device identifiers in the set of device identifiers. For example, control circuitry 504 may determine that the cell phone is not on the list of devices associated with the house because this is the first time the cell phone has connected to the LAN. Process 800 proceeds to 814.

At 814, control circuitry 504 identifies the device 104 associated with the device identifier as a guest device. For example, control circuitry 504 tags the cell phone's device ID as a guest device. Process 800 proceeds to 816.

At 816, control circuitry 504 accesses, via a database of user profiles, a guest user profile associated with the guest device (e.g., user device 104). For example, control circuitry 504 may search the database of user profiles for a profile associated with the cell phone's device ID. Process 800 proceeds to 818.

At 818, control circuitry 504 registers the guest user profile as a profile with limited control of the display device 114. For example, control circuitry 504 may tag the guest user profile as a profile that has limited permissions to control the smart television (e.g., display device 114) in the house. Process 800 proceeds to 820.

At 820, control circuitry 504, in response to registering the guest user profile as the profile with limited control, receives a request for notifications from a guest user profile. For example, once the guest profile has been marked as a profile with limited access, the guest (e.g., user 110) may be able to use his cell phone (e.g., user device 104) to request notifications on the smart television (e.g., display device 114). Process 800 proceeds to 822.

At 822, control circuitry 504 retrieves, from the guest user profile, a set of interests. For example, control circuitry 504 may access the guest's user profile to find the guest's interests such as favorite sports teams, programs, movies, genres, or channels. Process 800 proceeds to 824.

At 824, control circuitry 504 determines a set of media assets currently available that match the set of interests of the user (e.g., user 110) from the guest user profile. For example, control circuitry 504 may, based on the guest's user profile, identify a sports game currently playing based on the guest's favorite team or may identify a movie about to start based on the guest's favorite actor. In another example, the guest's user profile may include account information for other social networks, such as Twitter, and determine the programs and interests of the user (e.g., user 110) based on who the guest follows on these social networks, such as Twitter. Process 800 proceeds to 826.

At 826, control circuitry 504 monitors the set of media assets for an event of interest to the user (e.g., user 110). For example, control circuitry 504 may monitor the programs identified as programs of interest to determine what is happening in each program. Process 800 proceeds to 828.

At 828, control circuitry 504 determines whether the event of interest to a user (e.g., user 110) associated with the guest user profile has occurred in one of the media assets in the set of media assets. For example, control circuitry 504 may receive from a server a set of timestamps for a movie, where each timestamp is a favorite scene of the guest for that movie. If the program has reached one of these timestamps or is about to reach one of these timestamps, control circuitry 504 may determine that an event of interest to the guest is occurring. Process 800 proceeds to 830.

At 830, control circuitry 504 generates for display, on the display device 114, a notification indicating the event of interest and the media asset. The display device 114 may be a device displaying content to multiple users and may be a device associated with another user's profile. For example, control circuitry 504 may generate a notification on the television (e.g., display device 114) that the guest's favorite team has just scored in the on-going sports game.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 8.

Figure 9:
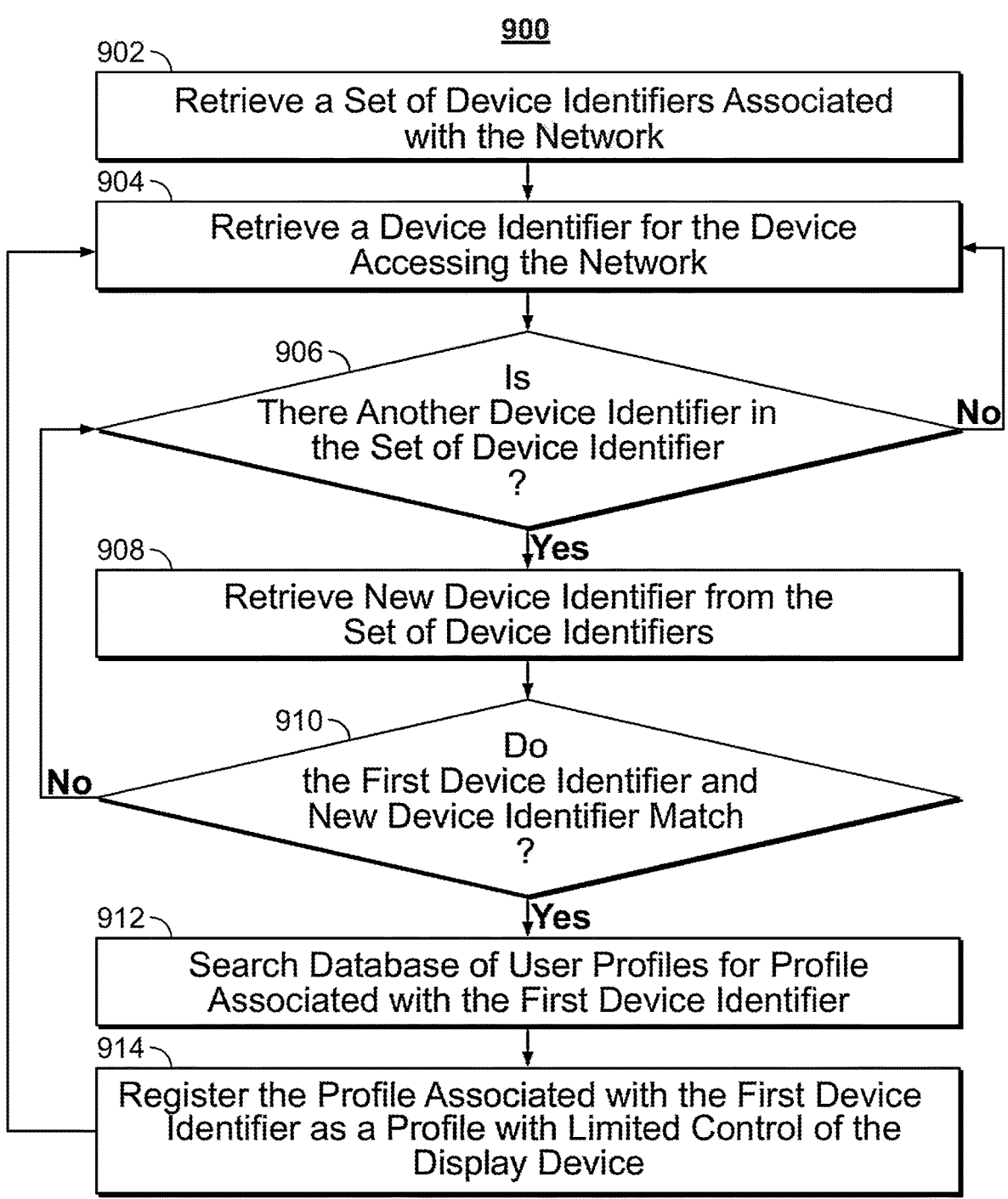
FIG. 9 is a flowchart of illustrative steps involved in registering that the first device identifier has limited control, in accordance with some embodiments of the disclosure.

FIG. 9 is a flowchart of illustrative steps involved in registering that the first device identifier has limited control, in accordance with some embodiments of the disclosure.

At 902, control circuitry 504 receives, from the server, the set of device identifiers associated with the network 116. For example, control circuitry 504 may receive, for a network associated with a house (e.g., network 116), a list of device identifiers that includes each resident's cell phone (e.g., user devices 102 and 106) and laptop, as well as the smart televisions (e.g., display device 114). Process 900 proceeds to 904.

At 904, control circuitry 504 receives a device identifier for the device (e.g., user device 104) accessing the network 116. For example, control circuitry 504 may detect a cell phone connecting with the LAN and receive the cellphone's device ID. A device ID may be a mac address, IP address, phone number, or other unique identifier. Process 900 proceeds to 906.

At 906, control circuitry 504 determines whether there is another device identifier in the set of device identifier. If there is another device identifier in the set of device identifier, process 900 proceeds to 908. Otherwise, process 900 proceeds to 904.

At 908, control circuitry 504 retrieves a new device identifier from the set of device identifiers. Process 900 proceeds to 910.

At 910, control circuitry 504 determines whether the first device identifier matches the new device identifier. If the first device identifier matches the new device identifier, process 900 proceeds to 912. Otherwise, process 900 proceeds to 906.

At 912, control circuitry 504 searches the database of user profiles for a profile associated with the first device identifier (e.g., a guest user profile associated with the guest device (e.g., user device 104)). For example, control circuitry 504 may search the database of user profiles for a profile associated with the cell phone's device ID. Process 900 proceeds to 914.

At 914, control circuitry 504 registers the profile associated with the first device identifier as a profile with limited control of the display device 114. For example, control circuitry 504 may tag the guest user profile as a profile that has limited permissions to control the smart television (e.g., display device 114) in the house. Process 900 proceeds to 904.

It is contemplated that the steps or descriptions of FIG. 9 may be used with any other embodiment of this disclosure. In addition, the steps and descriptions described in relation to FIG. 9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 9.

Figure 10:
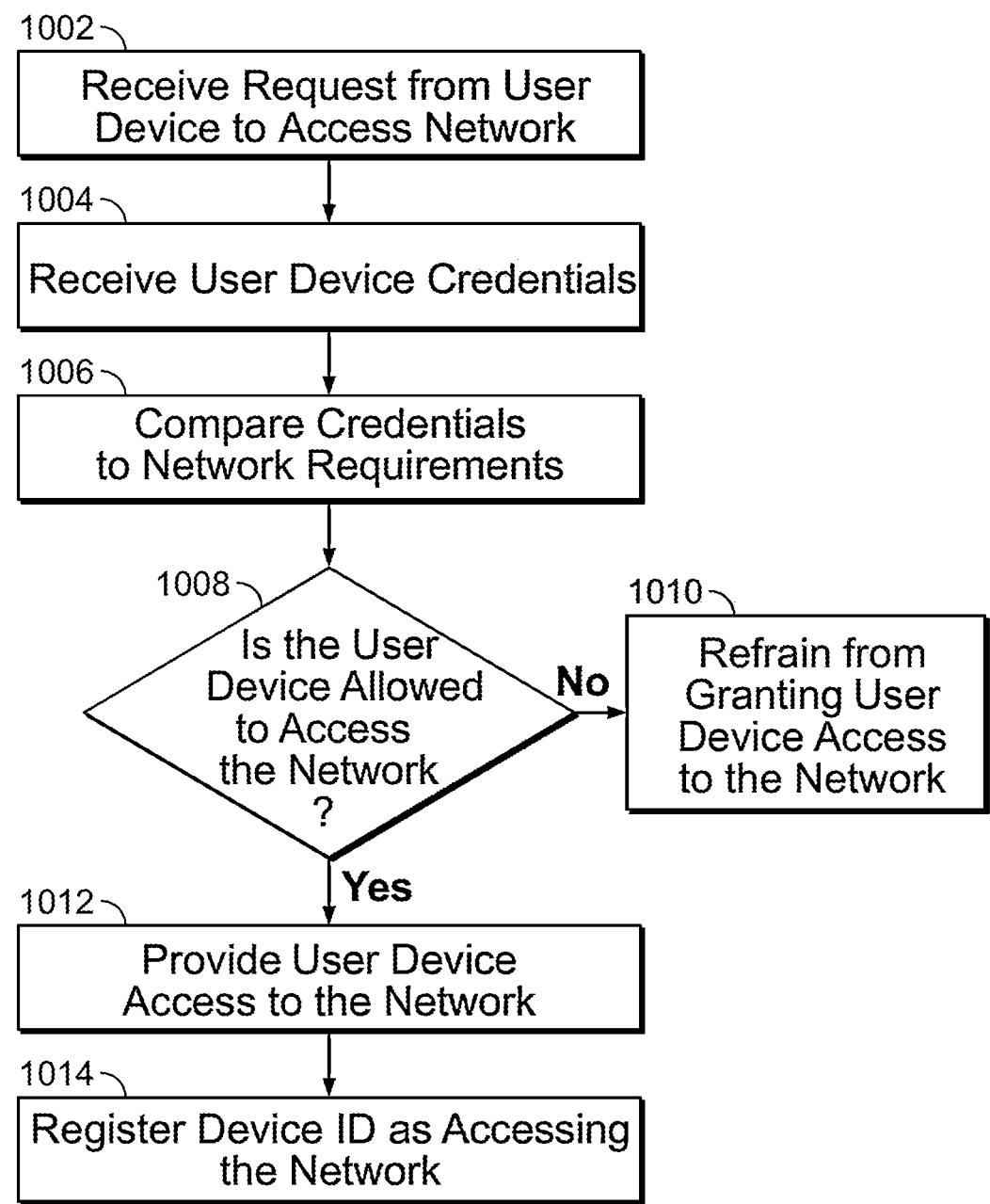
FIG. 10 is a flowchart of illustrative steps involved in detecting a device accessing a network, in accordance with some embodiments of the disclosure.

FIG. 10 is a flowchart of illustrative steps involved in detecting a device accessing a network, in accordance with some embodiments of the disclosure.

At 1002, control circuitry 504 receives a request from a user device to access the network (e.g., network 116). For example, a user may submit through his mobile device a request to connect to a LAN. Process 1000 proceeds to 1004.

At 1004, control circuitry 504 receives from device the device credentials. For example, control circuitry 504 may receive a password or other security information from the mobile device to access the LAN. Process 1000 proceeds to 1006.

At 1006, control circuitry 504 compares the credentials to the network requirements. For example, control circuitry 504 may compare the password provided to a password on record. Process 1000 proceeds to 1008.

At 1008, control circuitry 504 determines whether the devices are allowed to access the network (e.g., network 116). If control circuitry 504 determines that, based on the received credentials, the device is not allowed to access the network, process 1000 proceeds to 1010. Otherwise, process 1000 proceeds to 1012.

At 1010, control circuitry 504 refrains from granting the device access to the network. For example, control circuitry 504 may provide the user an error message indicating that the credentials were rejected.

At 1012, control circuitry 504 provides the device access to the network. For example, control circuitry 504 may connect the user device to the LAN. Process 1000 proceeds to 1014.

At 1014, control circuitry 504 registers the Device ID associated with the user device as accessing the network (e.g., network 116). For example, the device ID may be included in set of device ID stored in memory as accessing the network.

It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 10.

Figure 11:
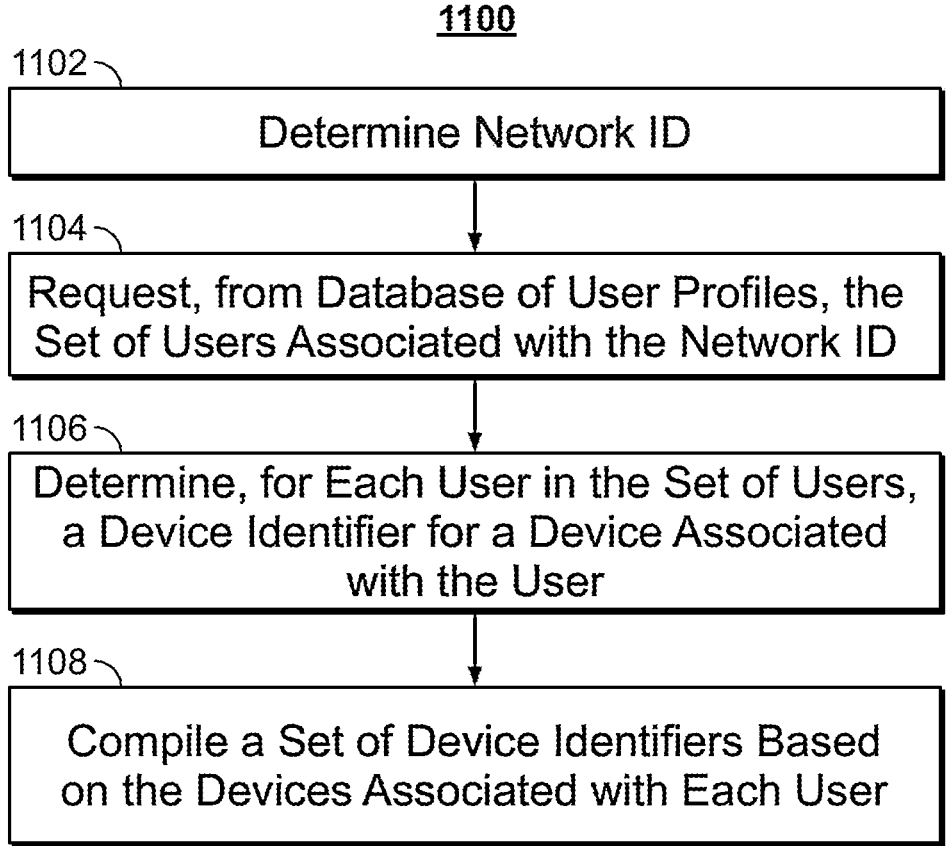
FIG. 11 is a flowchart of illustrative steps involved in determining a set of device identifiers associated with the network, in accordance with some embodiments of the disclosure.

FIG. 11 is a flowchart of illustrative steps involved in determining a set of device identifiers associated with the network, in accordance with some embodiments of the disclosure.

At 1102, control circuitry 504 determines the network ID. For example, the network may have an assigned name or other identifier. Process 1100 proceeds to 1104.

At 1104, control circuitry 504 requests, from the database of user profiles, the set of users associated with the network ID. For example, each resident of a house may have in his user profile the network ID associated with his house. Process 1100 proceeds to 1106.

At 1106, control circuitry 504 determines, for each user in the set of users, a device identifier for a device associated with the user. For example, control circuitry 504 may determine the IP address for the laptop of each resident of the house. Process 1100 proceeds to 1108.

At 1108, control circuitry 504 compiles a set of device identifiers based on the devices associated with each user. For example, the set of device identifiers may include a device identifier for each resident's cell phone and laptop.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 11.

Figure 12:
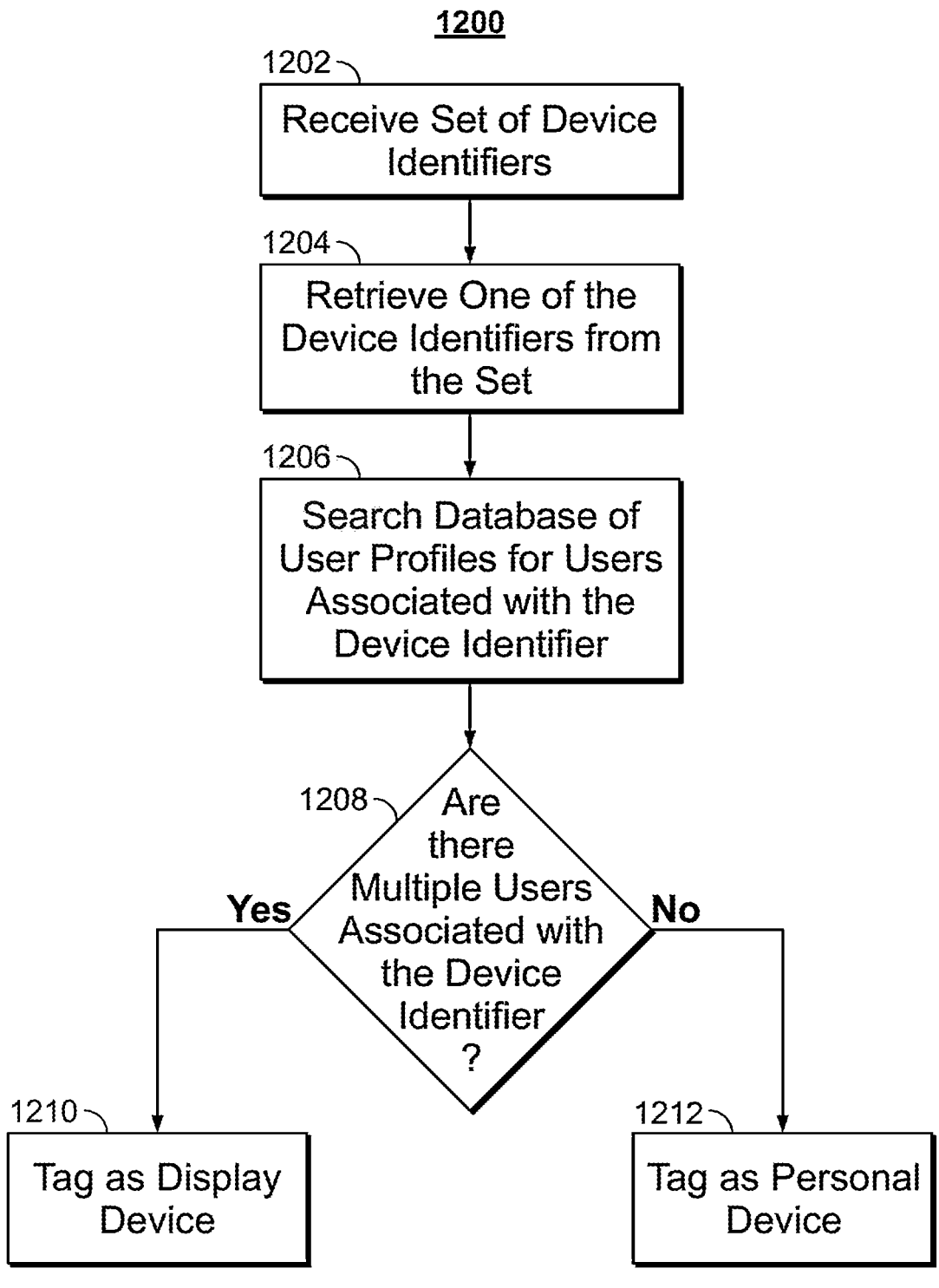
FIG. 12 is a flowchart of illustrative steps involved in determining that a device from the set of device identifiers is a display device, in accordance with some embodiments of the disclosure.

FIG. 12 is a flowchart of illustrative steps involved in determining that a device from the set of device identifiers is a display device, in accordance with some embodiments of the disclosure.

At 1202, control circuitry 504 receives a set of device identifiers. Control circuitry 504 may store, in memory, the set of device identifiers for each device associated with the network. Process 1200 proceeds to 1204.

At 1204, control circuitry 504 retrieves one of the device identifiers from the set of device identifiers. Process 1200 proceeds to 1206.

At 1206, control circuitry 504 searches the database of user profiles for users associated with the device identifier. For example, control circuitry 504 may find the user associated with a cell phone. Process 1200 proceeds to 1208.

At 1208, control circuitry 504 determines whether there are multiple users associated with the device identifier. For example, a cell phone may only have one associated user, but multiple users may be associated with the same laptop or television. If control circuitry 504 determines that there are multiple users associated with the device identifier, process 1200 proceeds to 1210. Otherwise, process 1200 proceeds to 1212.

At 1210, control circuitry 504 tags the device as a display device. For example, control circuitry 504 may store a tag in association with the device identifier an indication that the device is a display device.

At 1212, control circuitry 504 tags the device as a personal device. For example, control circuitry 504 may store a tag in association with the device identifier an indication that the device is a personal device.

It is contemplated that the steps or descriptions of FIG. 12 may be used with any other embodiment of this disclosure. In addition, the steps and descriptions described in relation to FIG. 12 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 12.

Figure 13:
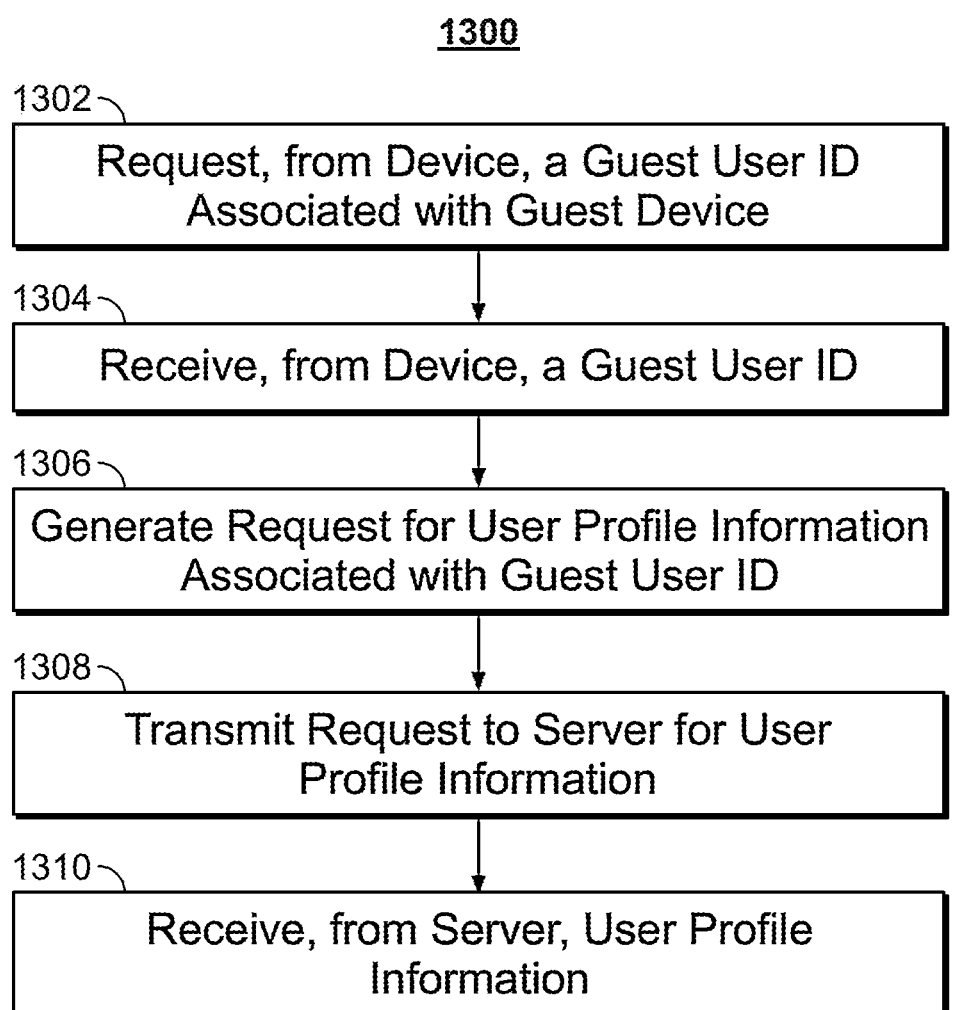
FIG. 13 is a flowchart of illustrative steps involved in accessing, via a database of user profiles, a guest user profile associated with the guest device, in accordance with some embodiments of the disclosure.

FIG. 13 is a flowchart of illustrative steps involved in accessing, via a database of user profiles, a guest user profile associated with the guest device, in accordance with some embodiments of the disclosure.

At 1302, control circuitry 504 requests a guest user ID associated with the guest device from the guest device. For example, control circuitry 504 may request the name of the user associated with a cell phone. Process 1300 proceeds to 1304.

At 1304, control circuitry 504 receives, from the guest device, a guest user ID. For example, control circuitry 504 may receive the name of a guest from the guest's cell phone. Process 1300 proceeds to 1306.

At 1306, control circuitry 504 generates a request for user profile information associated with guest user ID. For example, control circuitry 504 generates a request for user profile information based on the name of the guest. Process 1300 proceeds to 1308.

At 1308, control circuitry 504 transmits the request, to the server, for the user profile information. For example, control circuitry 504 may transmit the request for the user profile information, including the name of the guest. Process 1300 proceeds to 1310.

At 1310, control circuitry 504 receives, from the server, the user profile information. For example, control circuitry 504 may receive from the server, the user profile information associated with the name of the guest.

It is contemplated that the steps or descriptions of FIG. 13 may be used with any other embodiment of this disclosure. In addition, the steps and descriptions described in relation to FIG. 13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 13.

FIG. 14 is a flowchart of illustrative steps involved in identifying the device associated with the device identifier as a guest device, in accordance with some embodiments of the disclosure.

At 1402, control circuitry 504 receives, from the server, the guest user profile information. For example, control circuitry 504 may receive the guest user's preferences including a list of favorite shows. Process 1400 proceeds to 1404.

At 1404, control circuitry 504 identifies a user associated with the display device. For example, control circuitry 504 may identify a default user that is one of the users associated with the display device and is a resident of the household. Process 1400 proceeds to 1406.

At 1406, control circuitry 504 retrieves user preferences for conditional control of the display device. For example, the default user of the display device may have specific settings controlling the conditions for a guest to request notifications. Process 1400 proceeds to 1408.

At 1408, control circuitry 504 generates a tag based on the conditional control preferences. For example, the default user may have a preference that all guests can only request notifications for an hour at a time and so control circuitry 504 may generate a tag indicating this specific time frame. Process 1400 proceeds to 1410.

At 1410, control circuitry 504 stores the tag in the guest user profile information in memory. Process 1400 proceeds to 1412.

At 1412, control circuitry 504 accesses the tag in the guest user profile information. Process 1400 proceeds to 1414.

At 1414, control circuitry 504 determines whether the tag's conditions are met. If control circuitry 504 determines that the tag's conditions are met, process 1400 proceeds to 1412. Otherwise, process 1400 proceeds to 1416.

At 1416, control circuitry 504 deletes guest user profile information from memory. For example, if the time frame specified by the default user, and so the conditions of the tag are no longer met, the guest user is removed from the system by deleting the user profile information from memory.

It is contemplated that the steps or descriptions of FIG. 14 may be used with any other embodiment of this disclosure. In addition, the steps and descriptions described in relation to FIG. 14 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 14.

Figure 15:
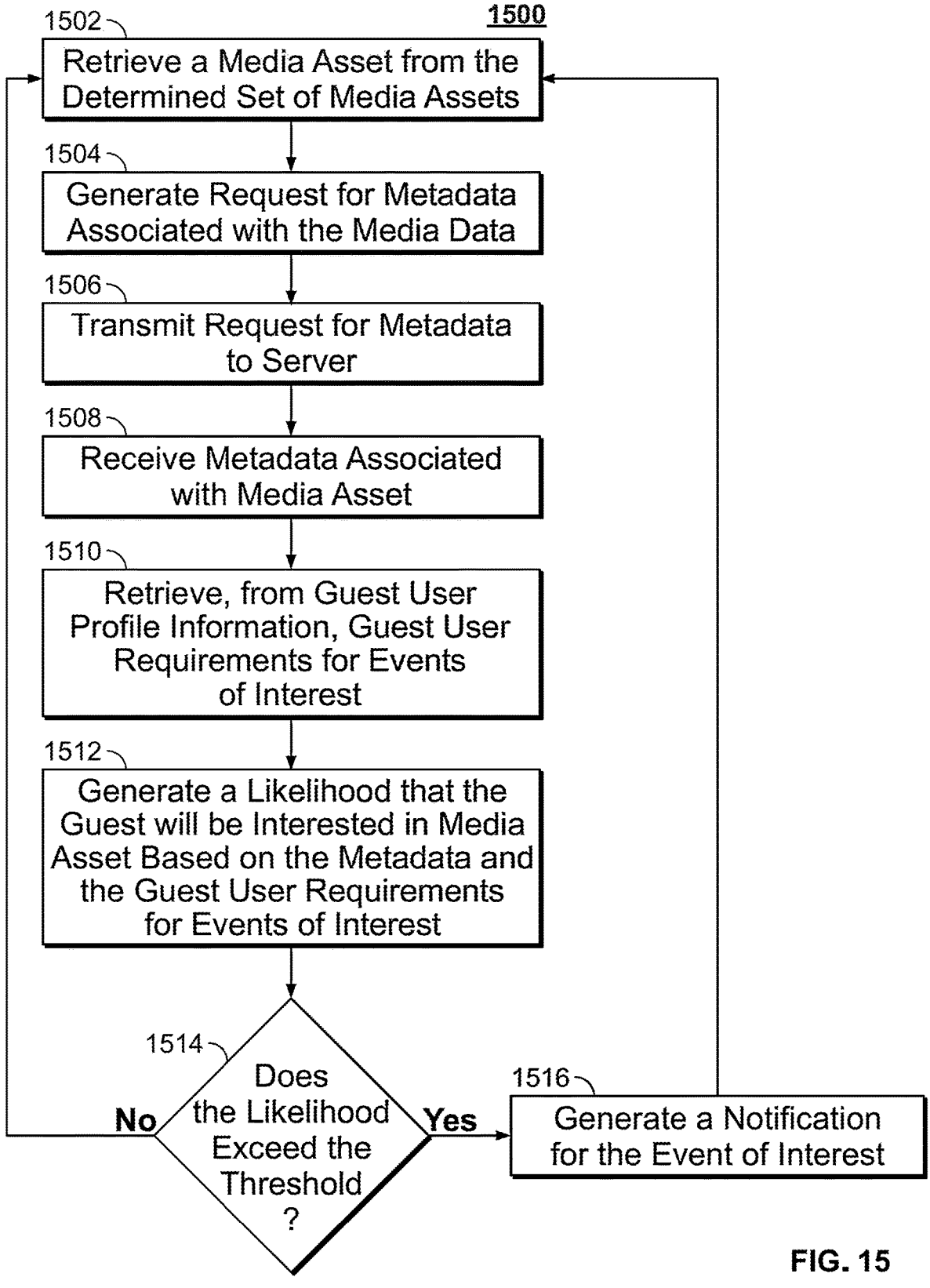
FIG. 15 is a flowchart of illustrative steps involved in determining whether an event of interest to the guest has occurred, in accordance with some embodiments of the disclosure.

FIG. 15 is a flowchart of illustrative steps involved in determining whether an event of interest to the guest has occurred, in accordance with some embodiments of the disclosure.

At 1502, control circuitry 504 retrieves a media asset from the determined set of media assets. For example, control circuitry 504 may retrieve a media asset from the guest's list of favorite television shows. Process 1500 proceeds to 1504. At 1504, control circuitry 504 generates a request for metadata associated with the media data. For example, control circuitry 504 may generate a request for the genre or actors associated with the favorite television show. Process 1500 proceeds to 1506.

At 1506, control circuitry 504 transmits the request for metadata to the server. Process 1500 proceeds to 1508.

At 1508, control circuitry 504 receives the metadata associated with the media asset from the server. Process 1500 proceeds to 1510.

At 1510, control circuitry 504 retrieves, from the guest user profile information, guest user requirements for events of interest. For example, the guest may indicate to be notified of every score made by a favorite team. Process 1500 proceeds to 1512.

At 1512, control circuitry 504 generates a likelihood that the guest will be interested in the media asset based on the metadata and the guest user requirements for events of interest. For example, control circuitry 504 may determine that a sports game has a high likelihood of interest because the metadata associated with the game shows that the guest's favorite team is playing and the guest's requirements indicate to be notified of all sports games. Process 1500 proceeds to 1514.

At 1514, control circuitry 504 determines whether the likelihood exceeds the threshold for likelihood of interest. If the likelihood does exceed the threshold, process 1500 proceeds to 1516. Otherwise, process 1500 proceeds to 1502.

At 1516, control circuitry 504 generates a notification for the event of interest. For example, control circuitry 504 may generate a display indicating the sports game and the two teams playing. Process 1500 proceeds to 1502.

It is contemplated that the steps or descriptions of FIG. 15 may be used with any other embodiment of this disclosure. In addition, the steps and descriptions described in relation to FIG. 15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 15.

FIG. 16 is a flowchart of illustrative steps involved in generating for display, on the display device, a notification indicating the event of interest and the media asset, in accordance with some embodiments of the disclosure.

At 1602, control circuitry 504 retrieves the media asset information from the server. For example, control circuitry 504 may receive the metadata associated with the media asset as well as an indication of an event of interest to a particular guest. Process 1600 proceeds to 1604.

At 1604, control circuitry 504 identifies the device identifier tagged as a display device. For example, control circuitry 504 may identify which device identifier of the device identifiers in memory is a display device. Process 1600 proceeds to 1606.

At 1606, control circuitry 504 identifies a user associated with the display device. For example, control circuitry 504 may identify a default user associated with the display device. Process 1600 proceeds to 1608.

At 1608, control circuitry 504 retrieves user profile information. For example, user profile information may include the favorites and preferences of the default user for the display device. Process 1600 proceeds to 1610.

At 1610, control circuitry 504 determines whether the user has muted the guest user notifications. If the user has muted guest notifications, process 1600 proceeds to 1612. Otherwise, process 1600 proceeds to 1616.

At 1612, control circuitry 504 determines whether the media asset matches the preferences of the user. If the media asset does not match the preferences of the user for the display device, process 1600 proceeds to 1614. Otherwise, process 1600 proceeds to 1616.

At 1614, control circuitry 504 generates notifications for the media asset on the guest device. For example, the guest may receive a notification on his personal cell phone indicating an event of interest.

At 1616, control circuitry 504 generates notifications for the media asset on the display device. For example, a notification of the event of interest may appear on the display device.

It is contemplated that the steps or descriptions of FIG. 16 may be used with any other embodiment of this disclosure. In addition, the steps and descriptions described in relation to FIG. 16 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIG. 16.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a request from a first device to control a second device;

assigning to the first device, based on a setting of the second device, a limited level of access for controlling the second device, wherein:

the limited level of access comprises a permission to modify which media content is transmitted for output by the second device; and receiving an input from the first device for controlling the second device; and performing a command based on the input from the first device, in response to determining that the input is a function permitted by the limited level of access for controlling the second device.

2. The method of claim 1, wherein the limited level of access comprises a prohibition of purchasing content.

3. The method of claim 1, wherein receiving the request from the first device to control the second device comprises determining that the first device and the second device are connected to a same local area network (LAN).

4. The method of claim 3, further comprising:

revoking the limited level of access for controlling the second device based on determining that the first device disconnected from the LAN.

5. The method of claim 1, further comprising:

revoking the limited level of access for controlling the second device based on identifying an attempt by the first device to access a function restricted by the limited level of access for controlling the second device.

6. The method of claim 1, wherein the limited level of access for controlling the second device comprises at least one of: a permission to adjust volume or a permission to change media.

7. The method of claim 1, further comprising:

creating a guest profile for the first device, wherein the guest profile for the first device comprises settings for formatting output of data transmitted from the first device to the second device.

8. The method of claim 1, wherein the setting of the second device comprises subscription data.

9. The method of claim 1, further comprising verifying the identifier of the first device using a secure authentication process.

10. The method of claim 1, further comprising providing a user interface for the first device to control the second device, wherein the user interface is limited based on the limited level of access for controlling the second device.

11. A system comprising:

an input/output circuitry configured to:

receive a request from a first device to control a second device;

a control circuitry configured to:

assign to the first device, based on a setting of the second device, a limited level of access for controlling the second device, wherein the limited level of access comprises a permission to modify which media content is transmitted for output by the second device; and wherein the input/output circuitry is further configured to:

receive an input from the first device for controlling the second device; and wherein the control circuitry is further configured to:

perform a command based on the input from the first device, in response to determining that the input is a function permitted by the limited level of access for controlling the second device.

12. The system of claim 11, wherein the limited level of access comprises a prohibition of purchasing content.

13. The system of claim 11, wherein the control circuitry is further configured, when receiving the request from the first device to control the second device, to determine that the first device and the second device are connected to a same local area network (LAN).

14. The system of claim 13, wherein the control circuitry is further configured to: revoke the limited level of access for controlling the second device based on determining that the first device is disconnected from the LAN.

15. The system of claim 11, wherein the control circuitry is further configured to: revoke the limited level of access for controlling the second device based on identifying an attempt by the first device to access a function restricted by the limited level of access for controlling the second device.

16. The system of claim 11, wherein the control circuitry is configured to: limit the level of access for controlling the second device comprising at least one of: a permission to adjust volume or a permission to change media.

17. The system of claim 11, wherein the control circuitry is further configured to: create a guest profile for the first device, wherein the guest profile for the first device comprises settings for formatting output of data transmitted from the first device to the second device.

18. The system of claim 17, wherein the setting of the second device comprises subscription data.

19. The system of claim 11, wherein the control circuitry is further configured to: verify the identifier of the first device using a secure authentication process.

20. The system of claim 11, wherein the control circuitry is further configured to: provide a user interface for the first device to control the second device, wherein the user interface is limited based on the limited level of access for controlling the second device.

* * * * *